US012219367B2

(12) United States Patent
Shin et al.

(10) Patent No.: US 12,219,367 B2
(45) Date of Patent: Feb. 4, 2025

(54) ADJUSTABLE COMMUNICATION EQUIPMENT ASSEMBLY STRUCTURE AND APPARATUS INCLUDING SAME

(71) Applicant: SAMSUNG ELECTRONICS CO., LTD., Suwon-si (KR)

(72) Inventors: Choonghwan Shin, Suwon-si (KR); Kyumyeong Kang, Suwon-si (KR); Kucheol Ahn, Suwon-si (KR); Byungwoog Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 406 days.

(21) Appl. No.: 17/845,234

(22) Filed: Jun. 21, 2022

(65) Prior Publication Data

US 2022/0330037 A1 Oct. 13, 2022

Related U.S. Application Data

(63) Continuation of application No. PCT/KR2020/018543, filed on Dec. 17, 2020.
(Continued)

(51) Int. Cl.
*H01Q 1/12* (2006.01)
*H04W 16/24* (2009.01)
*H04W 88/08* (2009.01)

(52) U.S. Cl.
CPC ............ *H04W 16/24* (2013.01); *H04W 88/08* (2013.01)

(58) Field of Classification Search
CPC ............ H01Q 1/12; H01Q 3/32; H01Q 1/246; H01Q 5/48; H01Q 25/001; H01Q 1/125;
(Continued)

(56) References Cited

U.S. PATENT DOCUMENTS 6,222,504 B1 * 4/2001 Oby .................. H01Q 3/04
343/890
6,342,870 B1 * 1/2002 Mehrkens .............. H01Q 25/00
343/890
(Continued)

FOREIGN PATENT DOCUMENTS

CN 201159381 12/2008
CN 203375125 1/2014
(Continued)

OTHER PUBLICATIONS

International Search Report for PCT/KR2020/018543 dated Apr. 16, 2021, 4 pages.
(Continued)

*Primary Examiner* — Cindy Trandai
(74) *Attorney, Agent, or Firm* — Nixon & Vanderhye, P.C.

(57) ABSTRACT

The present disclosure relates to a 5th generation (5G) or pre-5G communication system for supporting a higher data transmission rate after a 4th generation (4G) communication system such as long-term evolution (LTE). An apparatus according to an embodiment of the present disclosure may include: a first coupling portion including a rail structure comprising a rail and a slit structure comprising a slit, a second coupling portion coupled to communication equipment, and a third coupling portion, the third coupling portion may be disposed between the first coupling portion and the second coupling portion, and coupled to the rail structure and the second coupling portion, and may include a protrusion in an area adjacent to the second coupling portion, the protrusion may include a first inclined surface contacted based on the second coupling portion being tilted up and a second inclined surface contacted based on the second coupling portion being tilted down, based on the apparatus being in a first state, the third coupling portion may be
(Continued)

configured to move along the rail structure and be inserted into the slit structure, and based on the apparatus being in a second state, the third coupling portion may be configured to move along the rail structure and be disposed to be spaced apart from the first coupling portion.

20 Claims, 25 Drawing Sheets

Related U.S. Application Data

(60) Provisional application No. 62/951,227, filed on Dec. 20, 2019.

(58) Field of Classification Search
CPC .......... H01Q 1/1264; H01Q 3/06; H01Q 3/08; H01Q 1/1207; H01Q 1/084; F16M 11/10; F16M 13/022; F16M 13/027; F16B 2/065
See application file for complete search history.

(56) References Cited

U.S. PATENT DOCUMENTS

| | | | |
|---|---|---|---|
| 7,142,168 B1 * | 11/2006 | Sinclair | H01Q 19/10 343/890 |
| 7,755,563 B2 * | 7/2010 | Berry | G06K 7/10336 343/878 |
| 8,794,578 B2 * | 8/2014 | Lin | H01Q 1/125 343/890 |
| 10,608,316 B2 * | 3/2020 | Moheb | F16M 11/10 |
| 11,038,253 B1 * | 6/2021 | Tseng | H01Q 1/288 |
| 12,027,748 B2 * | 7/2024 | Han | H01Q 1/12 |
| 2002/0196195 A1 * | 12/2002 | Vermette | H01Q 1/125 343/882 |
| 2007/0221807 A1 | 9/2007 | Park | |
| 2012/0211627 A1 * | 8/2012 | Lee | H01Q 1/1228 24/457 |
| 2014/0266943 A1 * | 9/2014 | Thomson | H01Q 1/1228 343/765 |
| 2014/0306072 A1 * | 10/2014 | Yang | H01Q 3/06 248/124.1 |
| 2016/0359224 A1 * | 12/2016 | Mellor | H01Q 3/06 |
| 2018/0351248 A1 | 12/2018 | Kim et al. | |

FOREIGN PATENT DOCUMENTS

| | | |
|---|---|---|
| JP | H11-097920 | 4/1999 |
| KR | 2003-0018954 | 3/2003 |
| KR | 20-2011-0001415 | 2/2011 |
| KR | 10-1273595 | 6/2013 |
| KR | 10-2015-0009214 | 1/2015 |
| KR | 10-2017-0088217 | 8/2017 |

OTHER PUBLICATIONS

Written Opinion for ISA for PCT/KR2020/018543 dated Apr. 16,2021, 4 pages.

* cited by examiner

ADJUSTABLE COMMUNICATION EQUIPMENT ASSEMBLY STRUCTURE AND APPARATUS INCLUDING SAME

CROSS-REFERENCE TO RELATED APPLICATIONS

This application is a continuation of International Application No. PCT/KR2020/018543 designating the United States, filed on Dec. 17, 2020, in the Korean Intellectual Property Receiving Office and claiming priority to U.S. Provisional Patent Application No. 62/951,227, filed on Dec. 20, 2019, in the United States Patent and Trademark Office, the disclosures of which are incorporated by reference herein in their entireties.

BACKGROUND

Field

The disclosure relates to an adjustable communication equipment assembling structure and an apparatus including the same.

Description of Related Art

To satisfy a wireless data traffic demand which is growing after a $4^{th}$ generation (4G) communication system is commercialized, efforts are exerted to develop an advanced $5^{th}$ generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

For network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

The 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

In the communication system, communication equipment may be installed in various installation environments, and may be deployed in consideration of the installation environment for smooth communication. At this time, an assembling structure for connecting the communication equipment may include a mount bracket installed on a wall, a ceiling, a pole, or the like, and a unit bracket fastened to the communication equipment. If the communication equipment is installed, the unit bracket and the mount bracket of the assembling structure may be fastened. If the unit bracket and the mount bracket are fastened, the communication equipment may have a fixed separation distance in various installation environments such as a wall, a ceiling, and a pole. This may be the same even in using an assembling structure including a tilting function. For example, the assembling structure including the tilting function may require separation of a specific distance from the installation environment (a wall, a pole) to avoid interference between the communication equipment and the surrounding installation environment, and the separation distance may be set by considering a maximum tilting angle. Accordingly, the assembling structure including the tilting function may have a greater separation distance than the assembling structure not including the tilting function, and may increase a size of the assembling structure. Hence, an assembling structure enabling communication equipment to perform smooth communication even in various installation environments is demanded.

SUMMARY

Embodiments of the disclosure provide a structure enabling communication equipment to perform smooth communication even in various installation environments using an adjustable assembling structure in a communication system.

Embodiments of the disclosure provide a structure for adjusting a separation distance from various installation environments using an adjustable assembling structure in a communication system.

Embodiments of the disclosure provide a structure for tilting even in various installation environments using an adjustable assembling structure in a communication system.

Embodiments of the disclosure provide a structure for miniaturizing communication equipment using an adjustable assembling structure in a communication system.

According to various example embodiments of the present disclosure, an apparatus may include: a first coupling portion including a rail structure comprising a rail and a slit structure comprising a slit, a second coupling portion coupled to communication equipment, and a third coupling portion, the third coupling portion may be disposed between the first coupling portion and the second coupling portion, and coupled to the rail structure and the second coupling portion, and may include a protrusion in an area adjacent to the second coupling portion, the protrusion may include a first inclined surface contacted based on the second coupling portion being tilted up and a second inclined surface contacted based on the second coupling portion being tilted down, based on the apparatus being in a first state, the third coupling portion may be configured to move along the rail structure and be inserted into the slit structure, and based on the apparatus being in a second state, the third coupling portion may be configured to move along the rail structure and be disposed to be spaced apart from the first coupling portion.

According to various example embodiments of the present disclosure, a base station may include: communication equipment, a pole and an assembling structure disposed between the pole and the communication equipment, the assembling structure may include: a first coupling portion including a rail structure comprising a rail and a slit structure comprising a slit, a second coupling portion coupled to the communication equipment, and a third coupling portion, the third coupling portion may be disposed between the first coupling portion and the second coupling portion, and coupled to the rail structure and the second coupling portion, and may include a protrusion in an area adjacent to the second coupling portion, the protrusion may include a first inclined surface contacted based on the second coupling portion being tilted up and a second inclined surface contacted based on the second coupling portion being tilted down, based on the assembling structure being in a first state, the third coupling portion may be configured to move along the rail structure and be inserted into the slit structure, and based on the assembling structure being in a second state, the third coupling portion may be configured to move along the rail structure and be disposed to be spaced apart from the first coupling portion.

An apparatus according to various example embodiments of the present disclosure, may adjust a separation distance from communication equipment to an installation environment using a specific assembling structure.

An apparatus according to various example embodiments of the present disclosure, may minimize and/or reduce interference with various installation environments which may occur according to a tilting angle by use of a specific structure of an assembling structure.

Effects obtainable from the present disclosure are not limited to the above-mentioned effects, and other effects which are not mentioned may be clearly understood by those skilled in the art of the present disclosure through the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
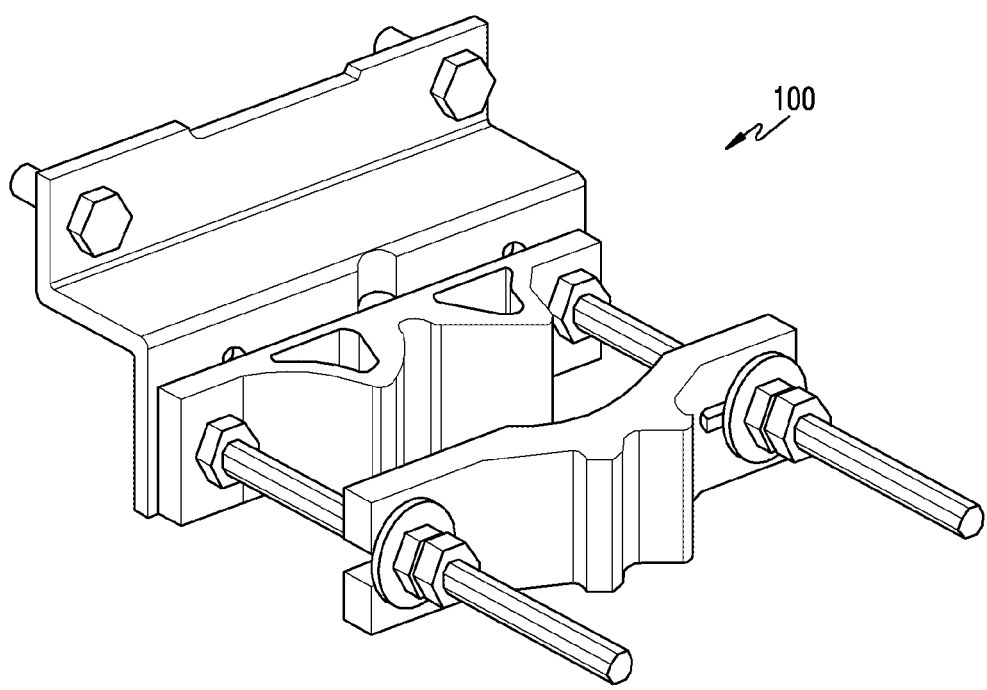
FIG. 1 is a perspective view illustrating an example of a conventional fixed assembling structure.

Terms used in the present disclosure are used merely to describe various embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, may not be interpreted as ideal or excessively formal meanings. In some cases, even terms defined in the present disclosure may not be interpreted to exclude embodiments of the present disclosure.

A hardware-based approach will be described as an example in various embodiments of the present disclosure to be described. However, various embodiments of the present disclosure include technology which uses both hardware and software, and accordingly various embodiments of the present disclosure do not exclude a software-based approach.

Terms indicating parts of an electronic device (e.g., a board structure, a substrate, a printed circuit board (PCB), a flexible PCB (FPCB), a module, an antenna, an antenna element, a circuit, a processor, a chip, a component, a device), terms indicating shapes of a part (e.g., a structure body, a structure, a support portion, a contact portion, a protrusion, an opening), terms indicating connection portions between structures (e.g., a connection line, a feeding line, a connection portion, a contact portion, a feeding unit, a support portion, a contact structure, a conductive member, an assembly), and terms indicating circuits (e.g., a PCB, an FPCB, a signal line, a feeding line, a data line, a radio frequency (RF) signal line, an antenna line, an RF path, an RF module, an RF circuit) used in the following explanations may be used by way of example for convenience of description. Accordingly, the present disclosure is not limited to terms to be described, and other terms having equivalent technical meanings may be used. In addition, terms such as ' . . . unit', ' . . . er', ' . . . structure', and ' . . . body' used hereafter may indicate at least one shape structure or a unit for processing a function.

In a communication system, communication equipment may be disposed at a specific position in consideration of a surrounding environment to carry out smooth communication. For example, the communication equipment needs to be disposed in consideration of various installation environments (e.g., a wall, a ceiling, a pole, etc.). To fasten the communication equipment to various installation environments as such, an assembling structure (e.g., a bracket) for connecting or coupling each other may be required. However, if coupling the communication equipment and the installation environment using the assembling structure, using a fixed assembling structure may always require a specific separation distance, and producing a fixed assembling structure having various separation distances to solve this may cause complexity of the manufacturing process. In addition, even an assembling structure including a tilting function may require the separation distance between the communication equipment and the installation environment to perform tilting, and may cause a problem of increasing a size of the assembling structure.

Hereafter, in the assembling structure interconnecting the communication equipment and the installation environment, the present disclosure provides a structure (which may be referred to herein as a 'slidable assembling structure') in which a portion connected to the communication equipment and a portion connected to the installation environment are slidable. Using the slidable assembling structure, it may be used in various installation environments, and sizes of the communication equipment and the installation environment may be minimized and/or reduced.

Figure 2:
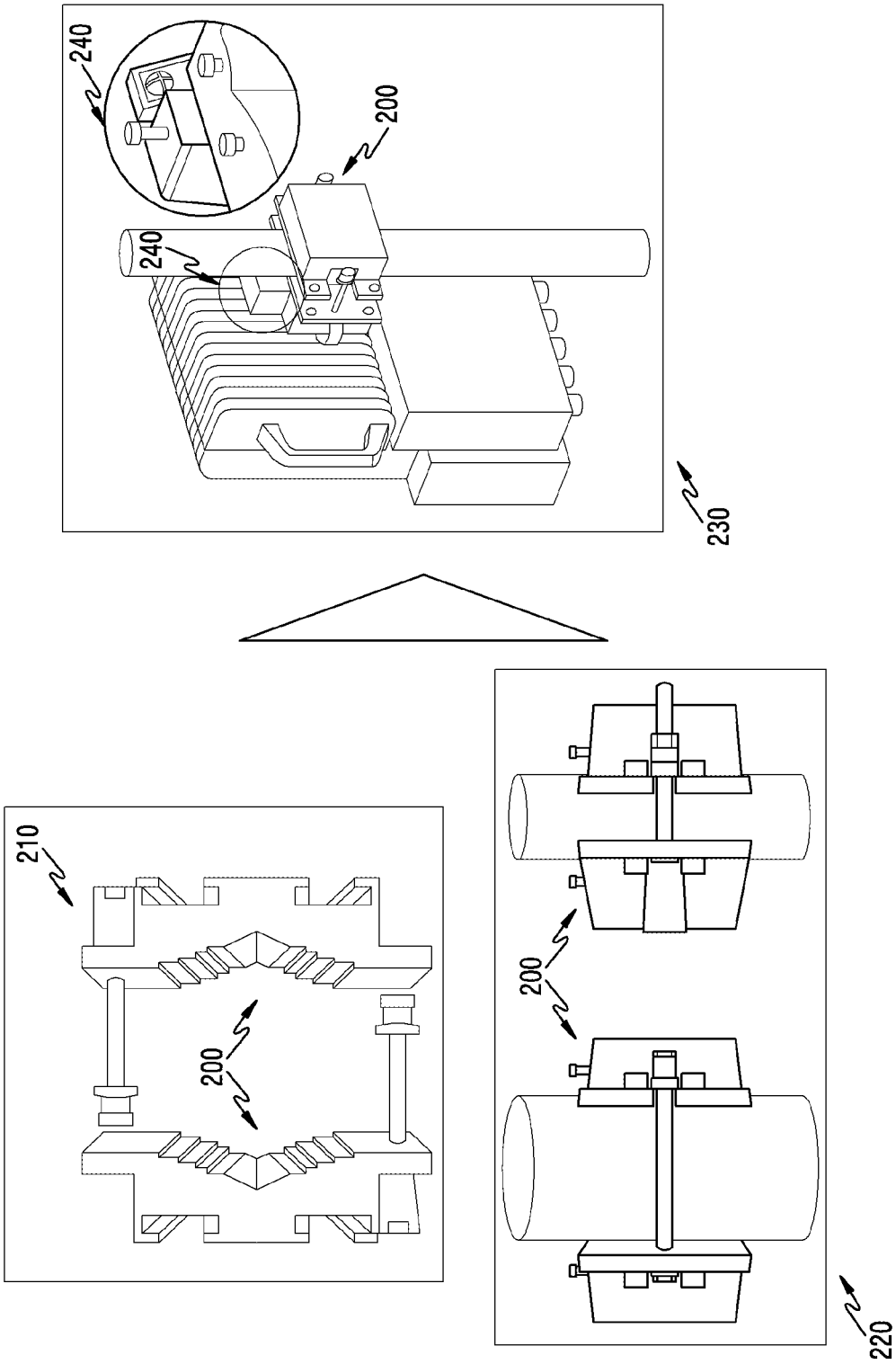
FIG. 2 is a diagram illustrating an example of a fixed assembling structure for describing an apparatus according to various embodiments.

FIG. 1 is a perspective view illustrating an example of a conventional fixed assembling structure for describing an apparatus. FIG. 2 is a diagram illustrating an example of a conventional fixed assembling structure.

Referring to FIG. 1, a conventional fixed assembling structure 100 is shown. The fixed assembling structure 100 may include a first coupling portion for coupling with an installation environment and a second coupling portion for coupling with communication equipment. In addition, the fixed assembling structure 100 may have a shape in which sizes of the first coupling portion and the second coupling portion are fixed. The communication equipment coupled with the second coupling portion of the fixed assembling structure 100 may have the same shape and separation distance from various installation environments.

Referring to FIG. 2, installation processes 210, 220, 230, and 240 of a fixed assembling structure 200 are illustrated. In this case, the fixed assembling structure 200 of FIG. 2 may be understood as the same as or similar to the fixed assembling structure 100 of FIG. 1. Referring to the installation process 210, two fixed assembling structures 200 may be connected in pairs. Referring to the installation process 220, the fixed assembling structure 200 may be coupled in installation environments (e.g., pols) having different thicknesses. At this time, the connection state of the first coupling portion of the fixed assembling structure 200 may differ depending on the installation environment. In addition, referring to the installation process 230, the fixed assembling structure 200 may be coupled to a pole through the first coupling portion, and may be connected to the communication equipment through the second coupling portion.

Referring to the installation process 240, the fixed assembling structure 200 may be coupled to the communication equipment by a coupling member (e.g., a screw, a bolt and a nut, etc.) in the second coupling portion. As such, the coupling between the installation environment and the communication equipment by the fixed assembling structure 200 may require a fixed separation distance. Hereafter, an assembling structure allowing a tilting function and separation distance adjustment will be described in FIG. 3 through FIG. 5.

Figure 3:
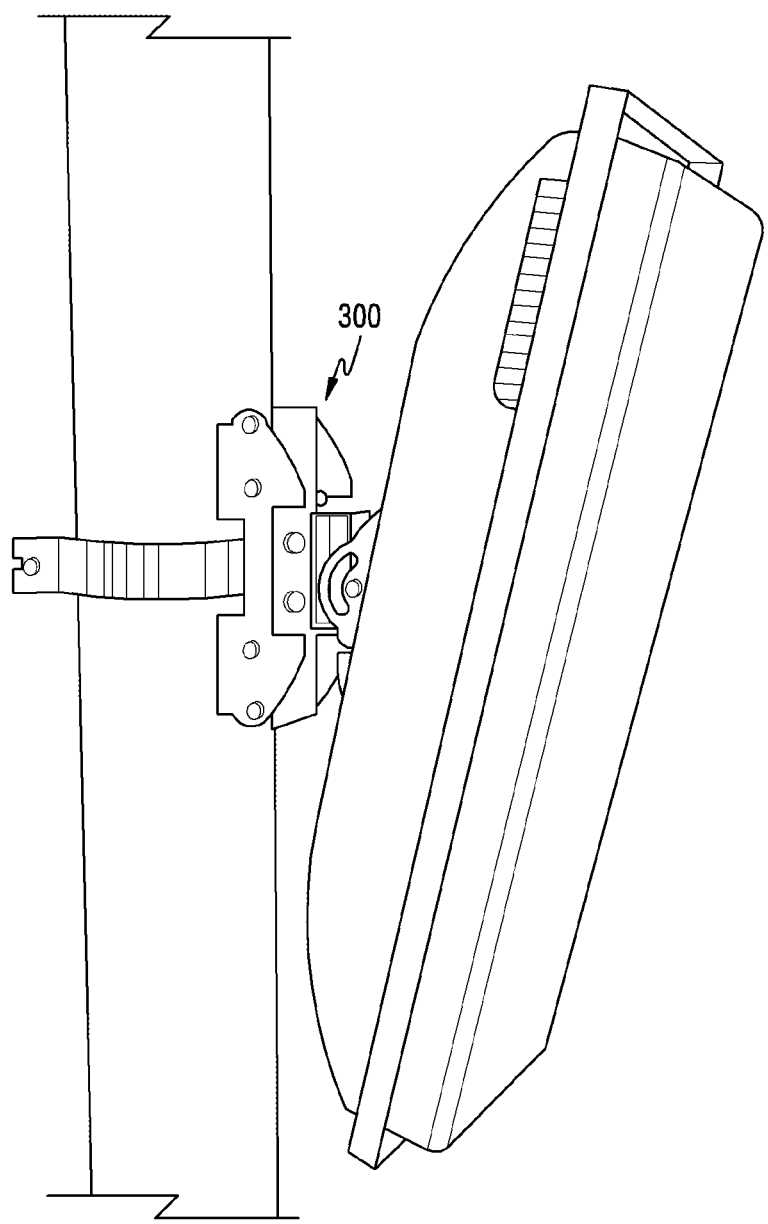
FIG. 3 is a diagram illustrating an example of a tilting assembling structure for an apparatus according to various embodiments.
Figure 4:
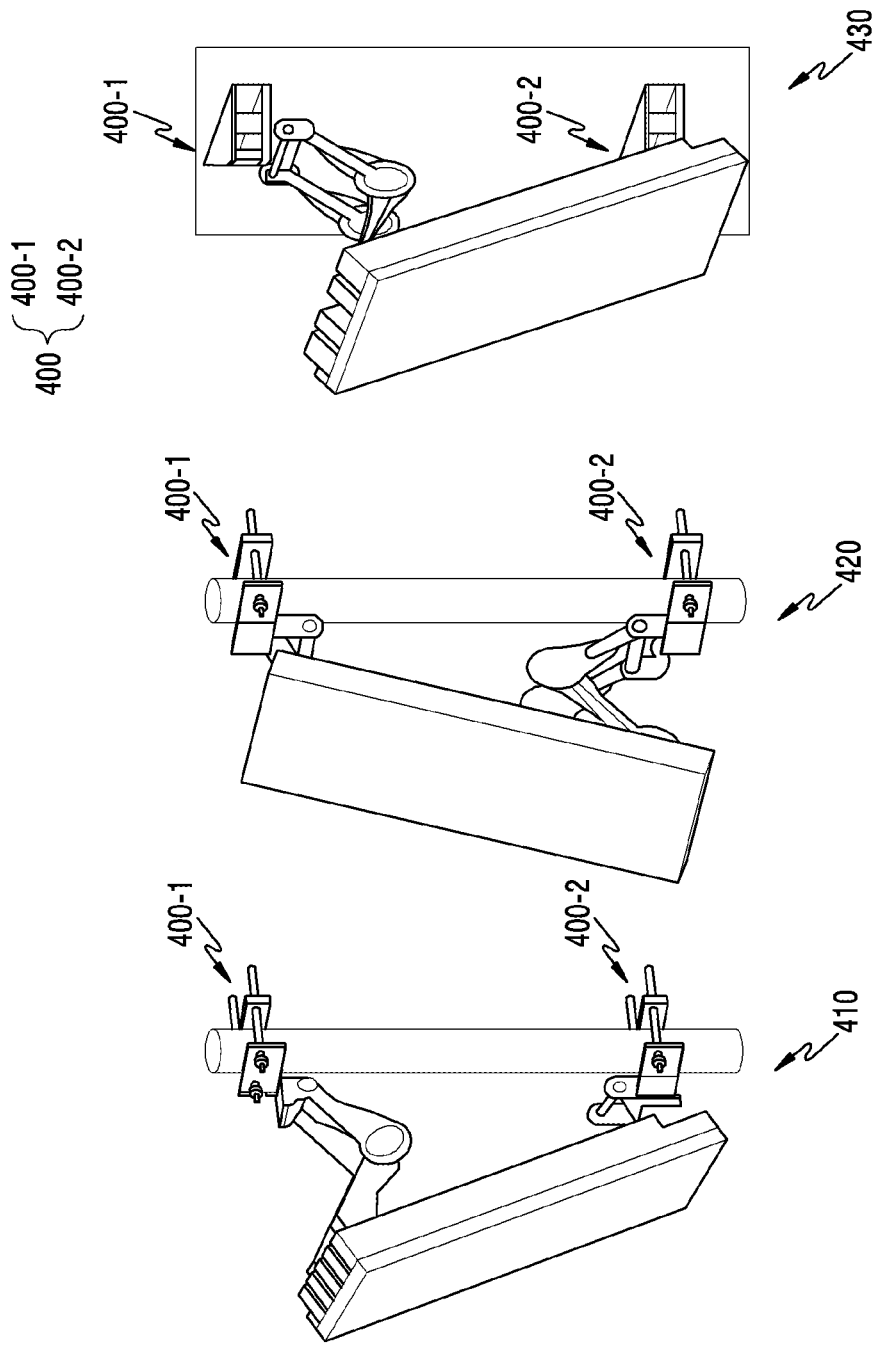
FIG. 4 is a diagram illustrating example of a tilting assembling structure for an apparatus according to various embodiments.
Figure 5:
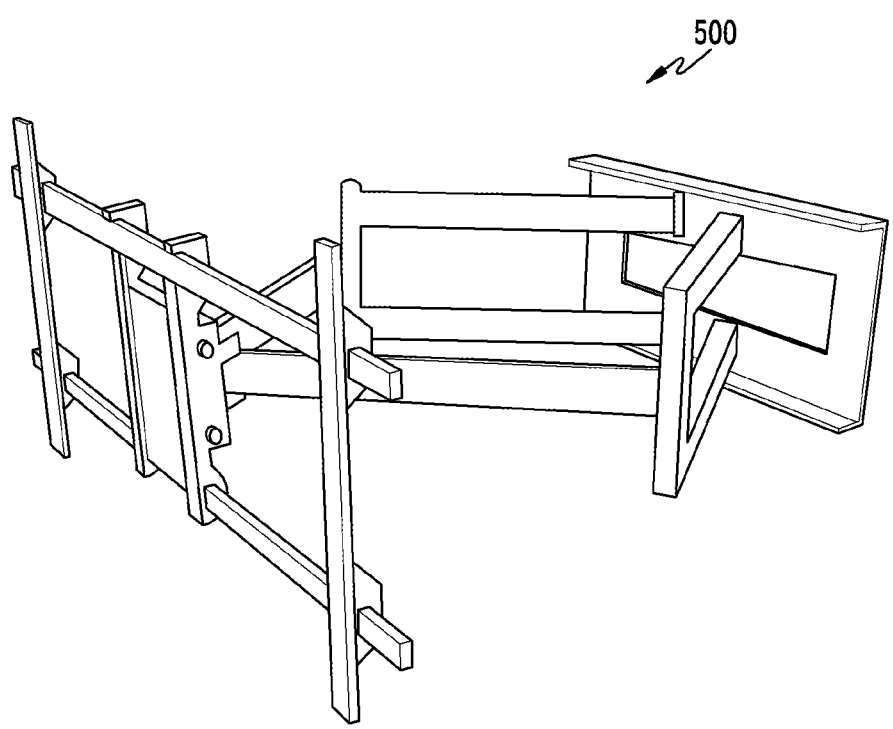
FIG. 5 is a diagram illustrating an example of a television (TV) assembling structure for an apparatus according to various embodiments.

FIG. 3 is a diagram illustrating an example of a tilting assembling structure of an apparatus according to various embodiments. FIG. 4 is a diagram illustrating an example of a tilting assembling structure of an apparatus according to various embodiments. FIG. 5 is a diagram illustrating an example of a television (TV) assembling structure of an apparatus according to various embodiments. The assembling structures of FIG. 3 through FIG. 5 may include a tilting function for adjusting an inclination of communication equipment, or may include a function for adjusting a separation distance according to an installation environment.

Referring to FIG. 3, an assembling structure 300 including a tilting function is illustrated. The assembling structure 300 may be coupled with an installation environment (e.g., a pole) and communication equipment. In addition, the inclination of the communication equipment may be adjusted by adjusting an inclination of a coupling portion through which the assembling structure 300 is coupled to the communication equipment. Notably, it may have a greater separation distance than an assembling structure (e.g., the assembling structure 200 of FIG. 2) not including the tilting function from the installation environment (e.g., a wall, a ceiling, a pole) to avoid interference between the tilted communication equipment and the surrounding installation environment. Herein, the separation distance may be determined based on a maximum tilting angle.

Referring to FIG. 4, a first drawing 410 showing that an assembling structure 400 including a first assembling structure 400-1 and a second assembling structure 400-2 is coupled with a pole and communication equipment and tilted down, a second drawing 420 showing that the assembling structure 400 including the first assembling structure 400-1 and the second assembling structure 400-2 is coupled with the pole and the communication equipment and tilted up, and a third drawing 430 showing that the assembling structure 400 including the first assembling structure 400-1 and the second assembling structure 400-2 is coupled with a wall surface and the communication equipment and tilted down are illustrated. Referring to FIG. 4, in the assembling structure 400 including the tilting function, the communication equipment may be tilted by coupling with at least two or more assembling structures.

Referring to FIG. 5, a TV assembling structure 500 is shown. The TV assembling structure 500 may connect an installation environment such as a wall and the TV, and may be formed in a specific structure for adjusting a separation distance between the installation environment and the TV.

As described above in FIG. 1 through FIG. 5, the fixed assembling structure may be fixed in the separation distance from its manufacturing. In addition, in the assembling structure including the tilting function, the separation distance may be determined based on a maximum tilting angle. For example, as a distance from a rotation axis for the tilting to an end point of the communication equipment increases, the separation distance from the installation environment (a wall, a pole) may increase. As such, if the tilting angle required in an actual installation environment is smaller than the maximum tilting angle, the assembling structure including the rotating axis to perform the tilting function and designed in consideration of the size of the communication equipment may form an unnecessary protruding region. This unnecessary protruding region may hinder efficient installation in installing the communication equipment. In the assembling structure 300 of FIG. 3, the separation distance may be set by considering the maximum tilting angle, and the separation distance may be fixed. In addition, in the assembling structure 400 of FIG. 4, at least two or more assembling structures may be required to perform the coupling with the communication equipment and the tilting function, and may be protruded a specific distance even if some of the assembling structures are folded by performing the tilting function. In addition, the TV assembling structure 500 of FIG. 5 may adjust the separation distance between the communication equipment and the installation environment but may not be adequate for an outdoor installation environment for installing the communication equipment installed at a base station.

The slidable assembling structure according to various embodiments of the present disclosure may be variously applied to various installation environmental conditions as the separation distance is adjustable, and adjust the separation distance according to the required tilting angle. In addition, even if the tilting function is performed, the separation distance may be adjusted through one assembling structure, which is more efficient than the conventional assembling structure in terms of space utilization. Additionally, if coupled with communication equipment, the slidable assembling structure according to various embodiments of the present disclosure may be flexibly coupled through one assembling structure despite the separation distance and the tilting angle required to change depending on various environments, and may maintain the same minimum volume as the assembling structure not including the tilting function in packaging and transportation. Hence, the assembling structure according to various embodiments of the present disclosure may be more efficient than the conventional assembling structure in the manufacturing and transportation processes and minimize/reduce a cost.

Hereinafter, a slidable assembling structure according to various example embodiments of the present disclosure will be described.

Figure 6:
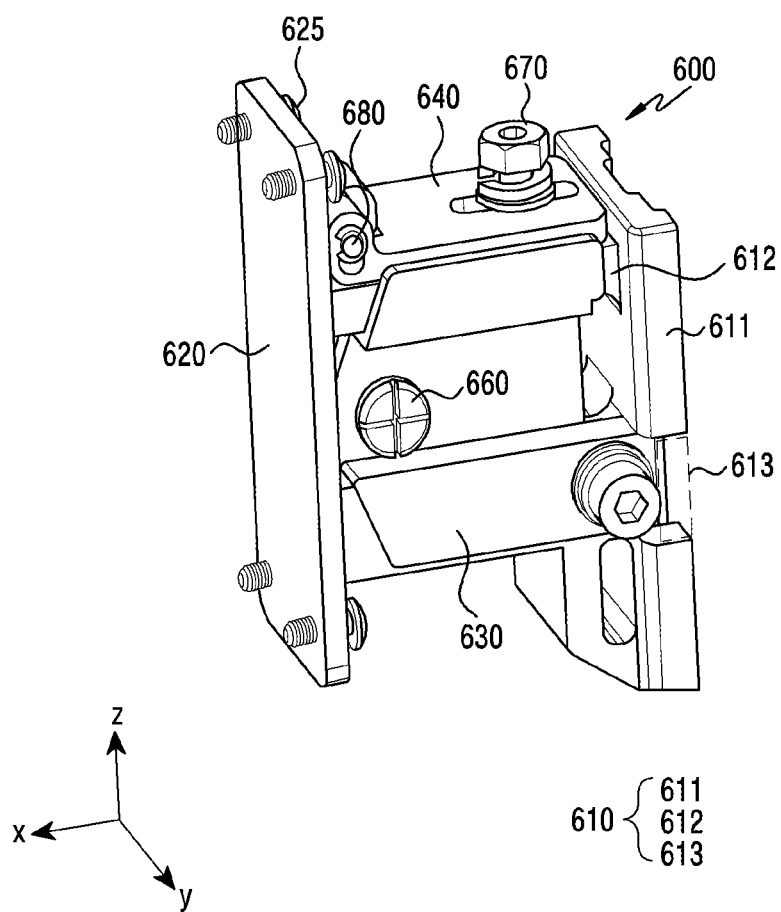
FIG. 6 perspective view illustrating an example of an apparatus according to various embodiments.
Figure 7:
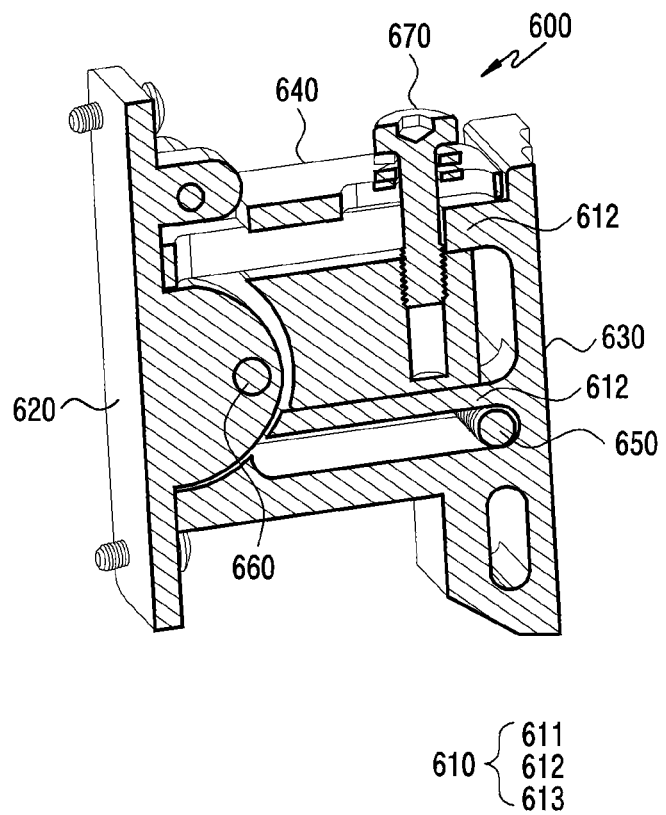
FIG. 7 is a perspective sectional view illustrating an example of an apparatus according to various embodiments.

FIG. 6 is a perspective view illustrating an example of an apparatus according to various embodiments. FIG. 7 is a sectional perspective view illustrating an example of an apparatus according to various embodiments of the present disclosure. FIG. 6 is a perspective view of an assembling structure 600 viewed from the y-axis, and FIG. 7 is a perspective view of an assembling structure 700 taken in a direction parallel to the x-axis and viewed from the y-axis.

Referring to FIG. 6 and FIG. 7, the assembling structure 600 may include a first coupling portion 610, a second coupling portion 620, a third coupling portion 630, a fixing portion 640, a first fixing member 650, a second fixing member 660, a third fixing member 670 and a fourth fixing member 680.

According to an embodiment, the first coupling portion 610 may include a first part 611 coupled with an installation environment (e.g., a wall, a ceiling, a pole, etc.), a rail structure 612 and a slit structure 613. According to an embodiment, a shape of the first part 611 may be changed in consideration of the coupled installation environment. For example, if the first coupling portion 610 is coupled to a pole, the first part 611 may be formed in a stepped structure for easy coupling. According to an embodiment, the rail structure 612 may be disposed above and below based on the third coupling portion 630, and may be coupled to the third coupling portion 630 for sliding. That is, the rail structure 612 may be a path along which the third coupling portion 630 moves as the state of the assembling structure 600 changes. According to an embodiment, the slit structure 613 may be disposed on a side surface of the first part 611. The third coupling portion 630 may be inserted into the slit structure 613 in a specific state (e.g., a first state) of the assembling structure 600. In addition, the first coupling portion 610 may be coupled to the third coupling portion 630 through the first fixing member 650, and may be fixed by connecting to the fixing portion 640 through the third fixing member 670.

According to an embodiment, the second coupling portion 620 may be coupled to a communication equipment. In this case, it may include holes through which the first coupling member 625 for coupling with the communication equipment passes. The second coupling portion 620 includes four holes in the assembling structure 600, but the present disclosure is not limited thereto. For example, the second coupling portion 620 may include at least one or more holes for coupling with communication equipment. The number or shape of the at least one or more holes may be determined based on the first coupling member 625 and the communication equipment. According to an embodiment, the second coupling portion 620 may be coupled to the third coupling portion 630. In this case, the second coupling portion 620 may be coupled to the third coupling portion 630 through the second fixing member 660. According to an embodiment, the second coupling portion 620 may be coupled based on the second fixing member 660 as a rotation axis to perform the tilting function. A maximum tilting angle of the second coupling portion 620 may be determined based on inclined surfaces of the third coupling portion 630. In addition, the second coupling portion 620 may be connected to the fixing portion 640 through the fourth fixing member 680 to be fixed in the tilted state after tilting.

According to an embodiment, the third coupling portion 630 may be coupled to the first coupling portion 610 through the first fixing member 650. The third coupling portion 630 may be coupled to the second coupling portion 620 through the second fixing member 660. The third coupling portion 630 may be coupled to the fixing portion 640 through the third fixing member 670. In addition, the third coupling portion 630 may be coupled with the rail structure 612 of the first coupling portion 610 to perform a sliding operation to be described. According to an embodiment, the third coupling portion 630 may include a protrusion. In this case, the protrusion may include a first inclined surface contacted if the second coupling portion 620 is tilted up and a second inclined surface contacted if the second coupling portion 620 is tilted down.

According to an embodiment, the fixing portion 640 may be coupled to the first coupling portion 610 and the third coupling portion 630 through the third fixing member 670. In addition, the fixing portion 640 may be coupled to the second coupling portion 620 by the fourth fixing member 680 for fixing the second coupling portion 620 in the tilted state.

As described above in FIG. 6 and FIG. 7, the assembling structure 600, which is connected to the first coupling portion 610, the second coupling portion 620, the third coupling portion 630 and the fixing portion 640, may be formed in the structure allowing the length adjustment and the tilting. Hereinafter, the sliding and tilting operations conducted by the assembling structure 600 shall be described in greater detail with reference to FIG. 8 through FIG. 12.

Figure 8:
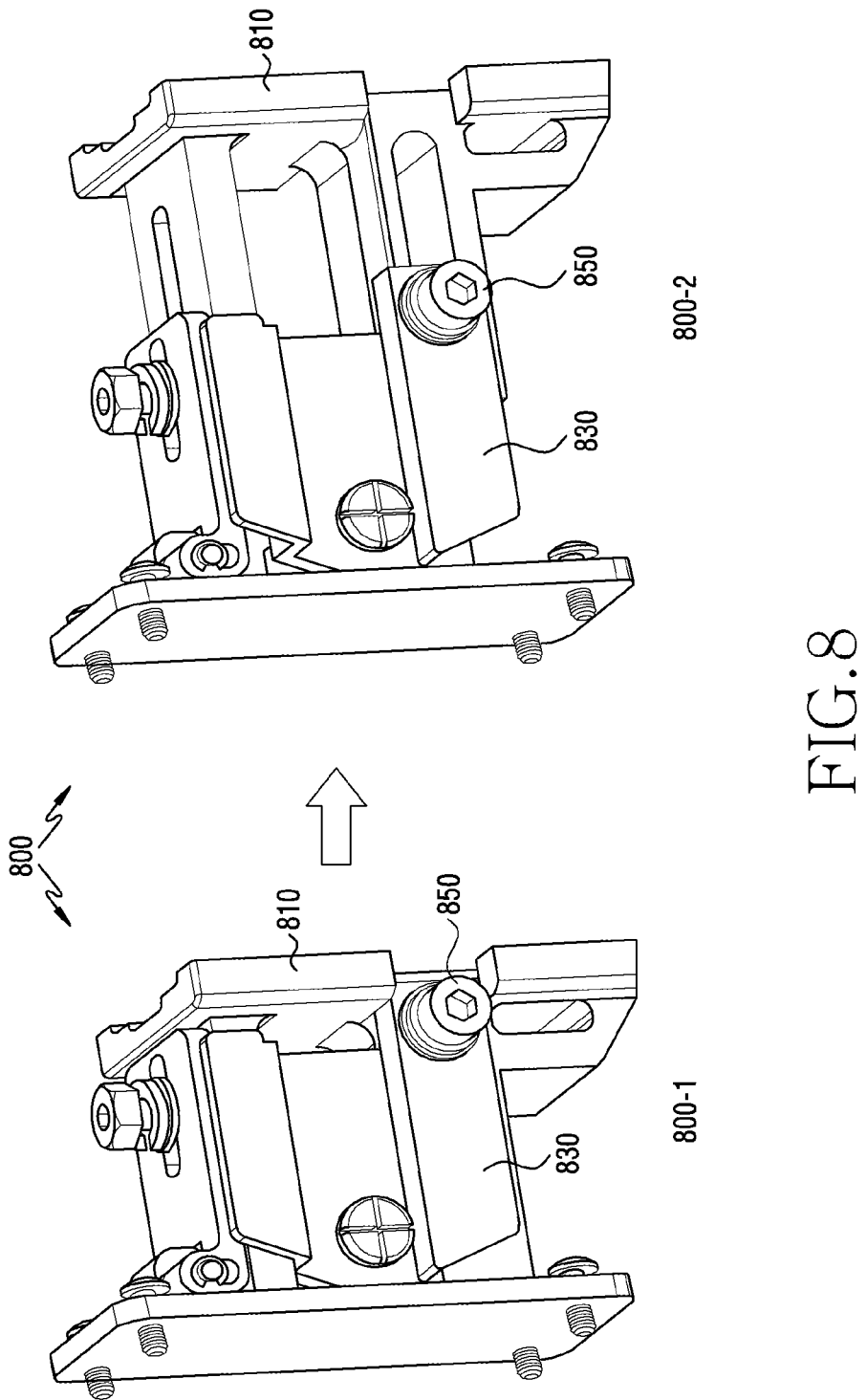
FIG. 8 includes perspective views illustrating a first state and a second state of an apparatus according to various embodiments.

FIG. 8 includes various perspective views illustrating a first state and a second state of an apparatus according to various embodiments. An assembling structure 800 of FIG. 8 may be understood the same as or similar to the assembling structure 600 of FIG. 6 and FIG. 7. For example, descriptions of a third coupling portion 830 and a first fixing member 850 of the assembling structure 800 may equally adopt the descriptions of the third coupling portion 630 and the first fixing member 650 of the assembling structure 600.

According to an embodiment, the assembling structure 800 may be formed in a first state 800-1 or a second state 800-2. In the first state 800-1, the third coupling portion 830 of the assembling structure 800 may be disposed to have a minimum separation distance from the first coupling portion 810. For example, the third coupling portion 830 may be inserted into a slit structure of the first coupling portion 810. At this time, the third coupling portion 830 may be fixed by coupling to the first fixing member 850. In the second state 800-2, the third coupling portion 830 of the assembling structure 800 may be disposed farther than the minimum separation distance from the first coupling portion 810. For example, the third coupling portion 830 may be discharged from the slit structure of the first coupling portion 810 and move along a rail structure of the first coupling portion 810, and accordingly may be spaced away from the first coupling portion 810 by a specific distance. At this time, the specific distance may be determined based on installation conditions of the assembling structure 800, and the maximum separation distance of the specific distance may be determined based on a length of the rail structure of the first coupling portion 810 of the assembling structure 800. For example, if the assembling structure 800 needs to be spaced apart from an installation environment (e.g., a wall, a ceiling, a pole) for smooth communication, the specific distance may be determined in consideration of this. As another example, if the assembling structure 800 is tilted, the specific distance may be determined by considering a maximum tilting angle. In addition, the third coupling portion 830 may be fixed by coupling to the first fixing member 850 while being spaced apart from the first coupling portion 810.

The assembling structure 800 may be installed in the first state 800-1 which maintains a minimum length, in an installation environment not requiring the sliding or tilting function for the separation distance adjustment. In the first state 800-1, the assembling structure 800 may be fixed to form a minimum separation distance between the communication equipment and the installation environment (e.g., a wall, a pole). The assembling structure 800 may be installed in the second state 800-1 in an installation environment requiring the sliding and tilting functions. Accordingly, a distance between the third coupling portion 830 and the first coupling portion 810 of the assembling structure 800 may increase. In particular, the assembling structure 800 of the second state 800-2 may adjust the separation distance to avoid interference between the communication equipment and the installation environment if the tilting function is applied.

Figure 9:
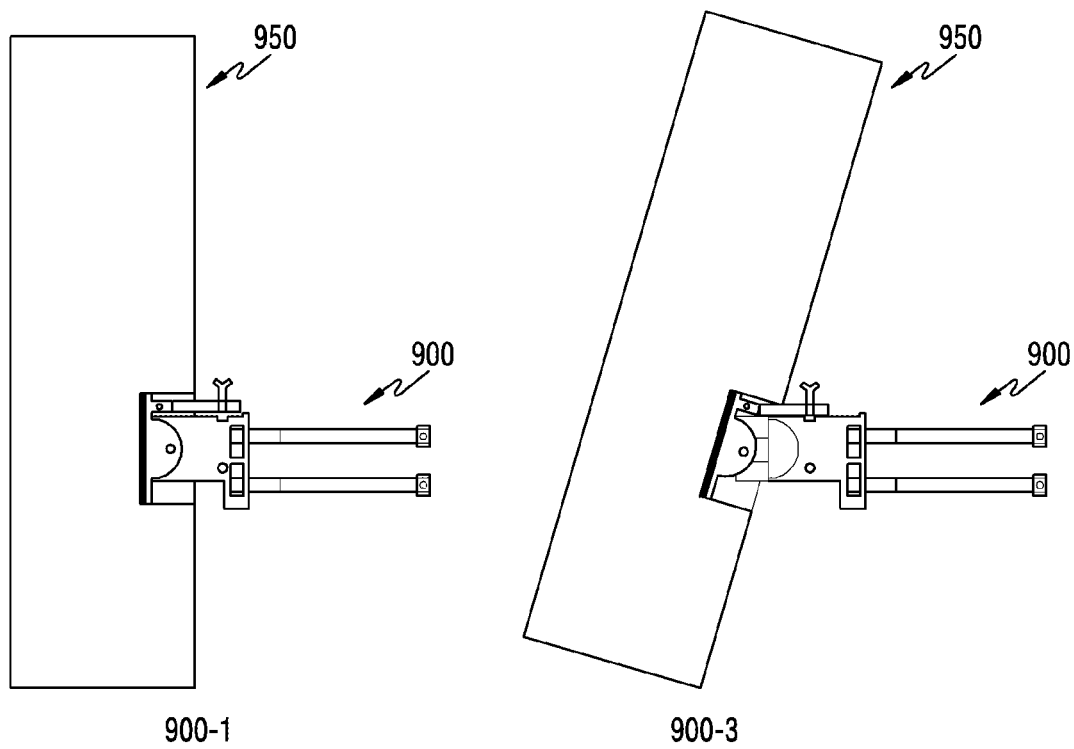
FIG. 9 is a diagram illustrating an up tilting operation of an apparatus according to various embodiments.

FIG. 9 is a diagram illustrating an up tilting operation of an apparatus according to various embodiments. An assembling structure 900 of FIG. 9 may be understood the same as or similar to the assembling structure 800 of FIG. 8. In addition, FIG. 9 illustrates that communication equipment 950 includes a groove on some surface to be coupled to the assembling structure 900 for convenience of description, but the present disclosure is not limited thereto. For example, the communication equipment 950 does not include a groove, and one surface of the communication equipment 950 and the assembling structure 900 may be coupled by a coupling member.

According to an embodiment, the assembling structure 900 may be formed in an up tilting state 900-3. In FIG. 9, for the sake of the explanation, the up tilting state 900-3 of the assembling structure 900 may indicate that it is spaced apart from an installation environment by a specific distance by sliding, and then tilted up. However, the present disclosure is not limited thereto. For example, the up tilting state 900-3 may indicate that no sliding is performed, that is, only up tilting is performed in the first state 900-1. In other words, the state of the assembling structure 900 may indicate that it may be flexibly changed based on installation conditions considering the installation environment. Referring to FIG. 9, the communication equipment 950 may be coupled vertically to the assembling structure 900 while maintaining a minimum separation distance by the assembling structure 900 of the first state 900-1. However, if the communication equipment 950 is to be tilted up at a specific angle, the communication equipment 950 may be spaced a specific distance away from the installation environment (e.g., a pole, a wall) by the assembling structure 900 of the up tilting state 900-3, and coupled with the installation environment while being tilted up at a specific angle. Hence, the communication equipment 950 may perform smooth communication while minimizing and/or reducing interference based on the surrounding environment. In addition, by coupling the assembling structure 900 inside the communication equipment 950 to be described, it is possible to minimize and/or reduce a space occupied by the communication equipment 950 and the installation environment.

Figure 10:
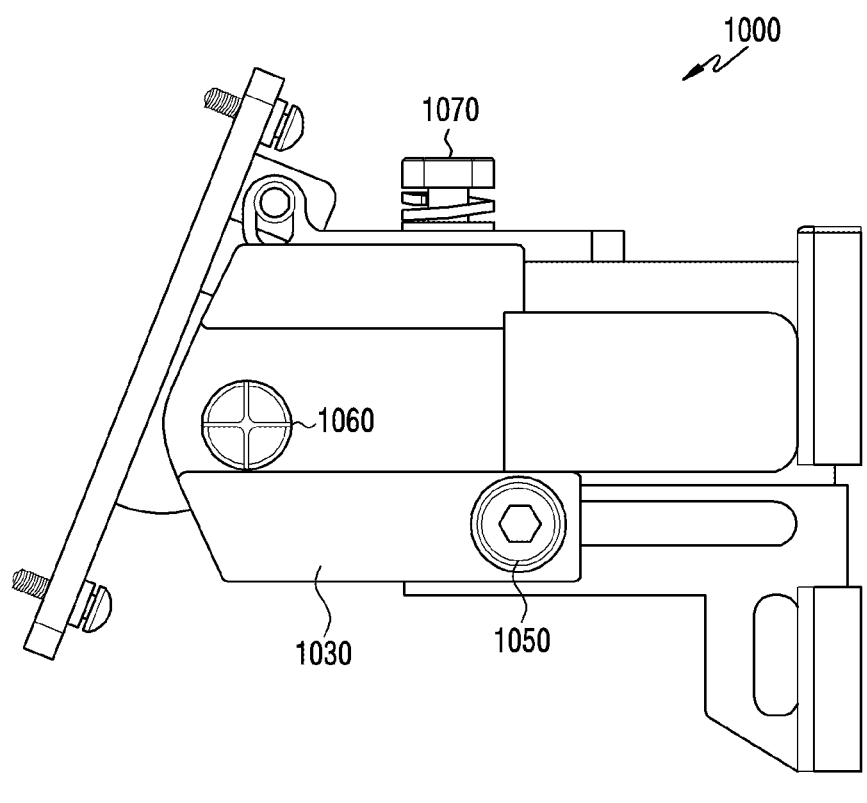
FIG. 10 is a perspective view illustrating an up tilting state of an apparatus according to various embodiments.

FIG. 10 is a perspective view illustrating an up tilting state of an apparatus according to various embodiments. An assembling structure 1000 of FIG. 10 may be understood the same as or similar to the assembling structure 900 of FIG. 9. For example, an up tilting state 1000-3 of the assembling structure 1000 may be understood as the same as or similar to the up tilting state 900-3 of the assembling structure 900. Notably, the present disclosure is not limited thereto, and the up tilting state may indicate that sliding is not conducted but only up tilting is performed as mentioned above. As described earlier, the assembling structure 1000 may be understood the same as or similar to the assembling structure 900, and accordingly the same description will be omitted.

Referring to FIG. 10, the assembling structure 1000 of the up tilting state 1000-3 is illustrated. The assembling structure 1000 may include a first fixing member 1050, a second fixing member 1060 and a third fixing member 1070. The up tilting state 1000-3 may indicate that the assembling structure 1000 is tilted up at a specific angle based on the second fixing member 1060 as a rotation axis. At this time, as communication equipment coupled with the assembling structure 1000 is tilted at y a specific angle, sliding by a specific distance may be required to minimize and/or reduce interference. Hence, a third coupling portion 1030 of the assembling structure 1000 may be slid, and after the sliding, the first fixing member 1050 and the third fixing member 1070 may be coupled to secure the assembling structure 1000 at the specific distance.

Figure 11:
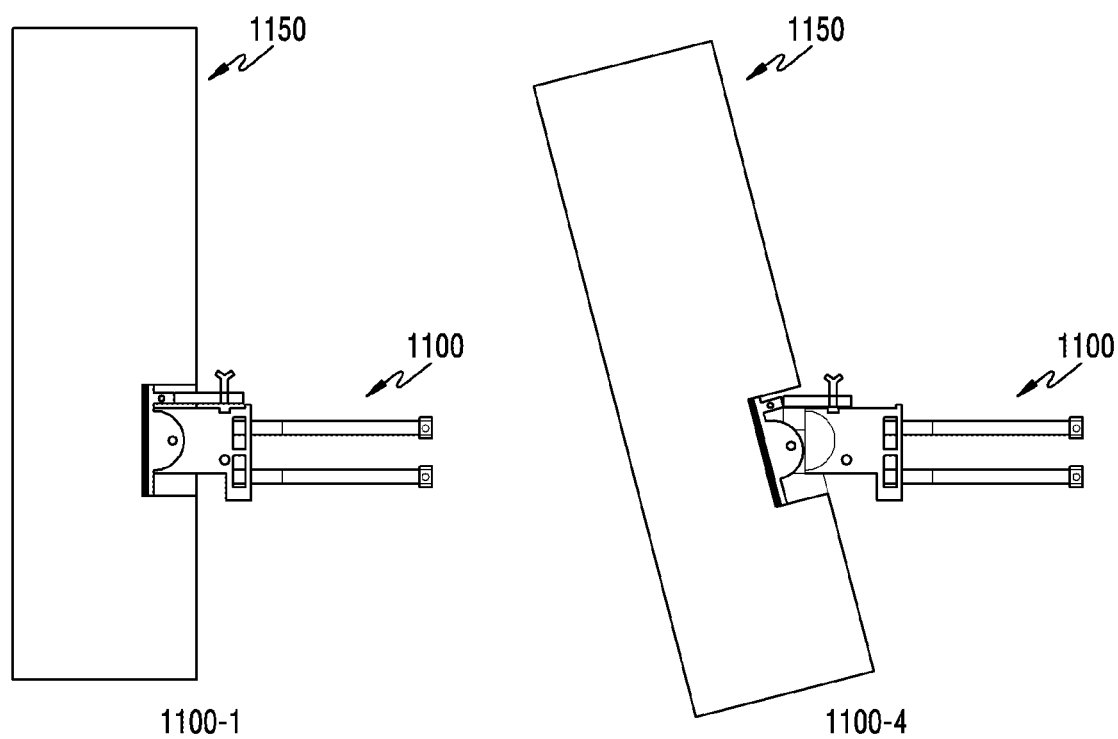
FIG. 11 is a diagram illustrating a down tilting operation of an apparatus according to various embodiments.

FIG. 11 is a diagram illustrating a down tilting operation of an apparatus according to various embodiments. An assembling structure 1100 of FIG. 11 may be understood the same as or similar to the assembling structure 800 of FIG. 8. In addition, FIG. 11 illustrates that communication equipment 1150 includes a groove on some surface to be coupled to the assembling structure 1100 for the sake of description, but the present disclosure is not limited thereto. For example, the communication equipment 1150 does not include a groove and one surface of the communication equipment 1150 and the assembling structure 1100 may be coupled by a coupling member.

According to an embodiment, the assembling structure 1100 may be formed in a down tilting state 1100-4. In FIG. 11, for the sake of explanation, the down tilting state 1100-4 of the assembling structure 1100 may indicate that it is spaced a specific distance apart from an installation environment by sliding, and then tilted down. However, the present disclosure is not limited thereto. For example, the down tilting state 1100-4 may indicate that no sliding is performed, that is, only the down tilting is performed in a first state 1100-1. In other words, it may that the state of the assembling structure 1100 may be flexibly changed based on installation conditions considering the installation environment. Referring to FIG. 11, the communication equipment 1150 may be coupled vertically to the assembling structure 1100 while maintaining a minimum separation distance by the assembling structure 1100 of the first state 1100-1. However, if the communication equipment 1150 is to be tilted down at a specific angle, the communication equipment 1150 may be spaced apart from the installation environment (e.g., a pole, a wall) by the assembling structure 1100 of the down tilting state 1100-3, and may be coupled with the installation environment while tilting down at a specific angle. Hence, the communication equipment 1150 may perform smooth communication while minimizing and/or reducing interference caused by the surrounding environment. In addition, by coupling the assembling structure 1100 inside the communication equipment 1150 to be described, a space occupied by the communication equipment 1150 and the installation environment. may be minimized and/or reduced.

Figure 12:
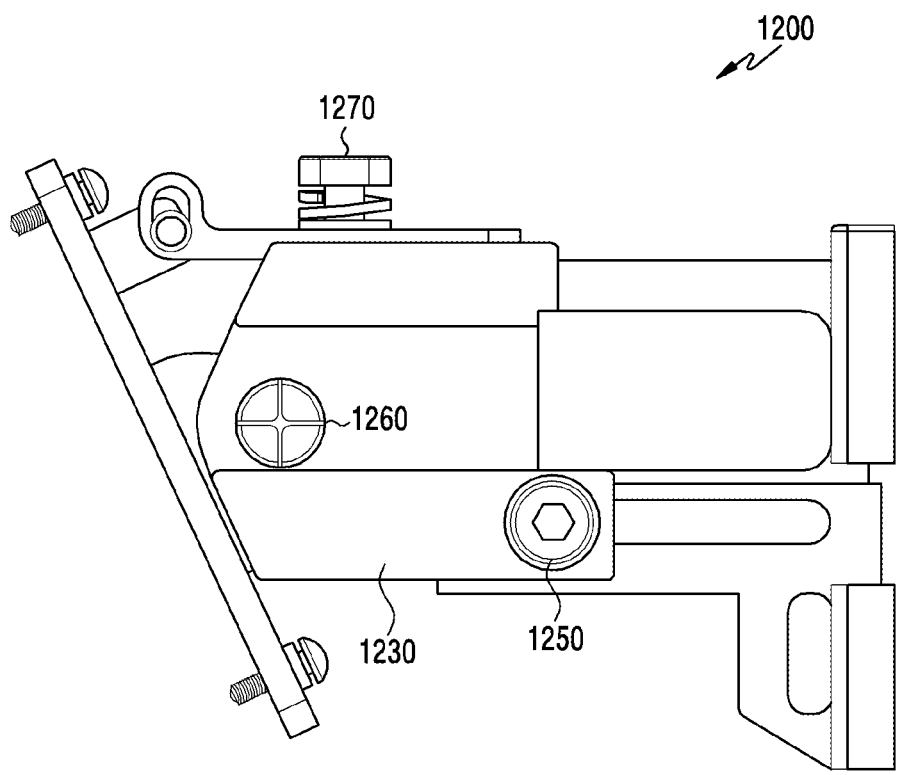
FIG. 12 is a perspective view illustrating a down tilting state of an apparatus according to various embodiments.

FIG. 12 is a perspective view illustrating a down tilting state of an apparatus according to various embodiments. An assembling structure 1200 of FIG. 12 may be understood the same as or similar to the assembling structure 1100 of FIG. 11. For example, a down tilting state 1200-4 of the assembling structure 1200 may be understood the same as or similar to the down tilting state 1100-4 of the assembling structure 1100. However, the present disclosure is not limited thereto, and the down tilting state may indicate that only down tilting is performed without sliding as described above. As aforementioned, the assembling structure 1200 may be understood the same as or similar to the assembling structure 1100, and the same description will be omitted.

Referring to FIG. 12, the assembling structure 1200 of the down tilting state 1200-4 is illustrated. The assembling structure 1200 may include a first fixing member 1250, a second fixing member 1260 and a third fixing member 1270. The down tilting state 1200-4 may indicate the assembling structure 1200 is tilted down at a specific angle based on the second fixing member 1260 as a rotation axis. At this time, as communication equipment coupled with the assembling structure 1200 is tilted at a specific angle, sliding by a specific distance may be necessary to minimize and/or reduce interference. Hence, the third coupling portion 1230 of the assembling structure 1200 may be slid, and after the sliding, the first fixing member 1250 and the third fixing member 1270 may be coupled to secure the assembling structure 1200 at the specific distance.

As described in FIG. 8 through FIG. 12, the assembling structure may be formed by changing the state based on the installation conditions considering the communication equipment and the installation environment. For example, if it is necessary to install the communication equipment in a direction parallel to the installation environment (e.g., a wall, a ceiling, a pole) and the space for installing the communication equipment is narrow, the assembling structure may be formed in the first state to interconnect the communication equipment and the installation environment. As another example, if it is necessary to install the communication equipment in a direction parallel to the installation environment (e.g., a wall, a ceiling, a pole) and to install the communication equipment apart from the installation environment over a specific distance, the assembling structure may be formed in the second state to interconnect the communication equipment and the installation environment. As yet another example, if it is necessary to communicate with other communication equipment located higher than the installation environment, the assembling structure may be formed in the up tilting state to interconnect the communication equipment and the installation environment. Notably, in this case, if it is necessary to stay away from the installation environment a specific distance to minimize and/or reduce interference of the installation environment or to secure the maximum tilting angle, the assembling structure may be slid and then tilted up. As still another example, if it is required to communicate with other communication equipment located in a lower place than the installation environment, the assembling structure may be formed in the down tilting state to interconnect the communication equipment and the installation environment. Notably, in this case, if it is necessary to stay away from the installation environment the specific distance to minimize and/or reduce the interference of the installation environment or to secure the maximum tilting angle, the assembling structure may be slid and then tilted down. As such, the slidable assembling structure according to an embodiment of the present disclosure may be adaptively installed in various environments compared to the conventional assembling structure even if the assembling structure is formed by the same manufacturing process, and thus may be simplified in the manufacturing process and produced at low cost. In addition, even if the assembling structure needs to be spaced apart over a specific distance in performing the tilting function, it may perform the tilting after being spaced apart only by the specific distance, and may efficiently utilize the space compared to the conventional assembling structure including the tilting function always with the minimum separation distance.

Hereinafter, connection and structure of a plurality of parts forming an assembling structure will be described, and thus effects according to various states of the assembling structure will be described.

Figure 13:
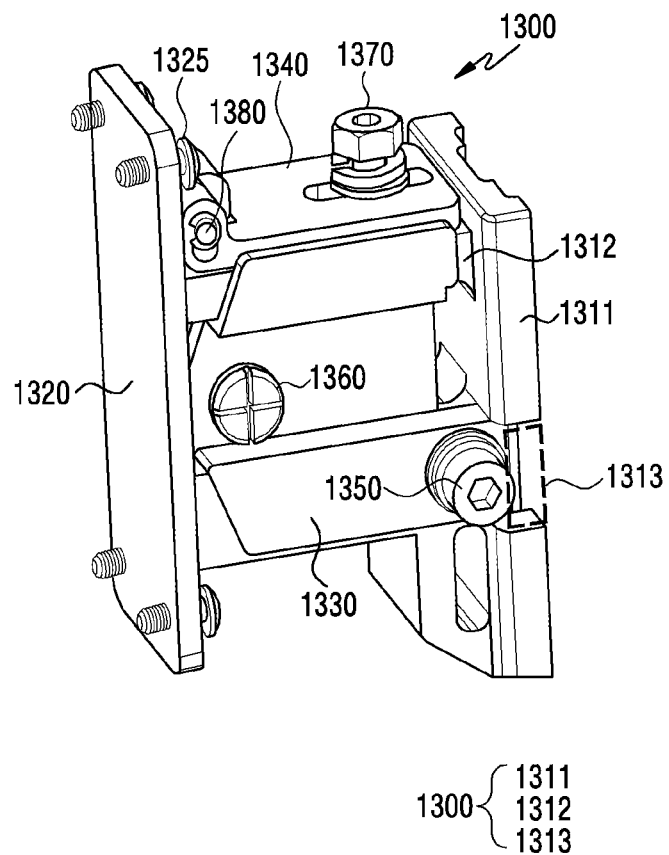
FIG. 13 is a perspective view illustrating an example of an apparatus according to various embodiments.

FIG. 13 is a perspective view illustrating an example of an apparatus according to various embodiments. Referring to FIG. 13, a perspective view of the apparatus according to various embodiments of the present disclosure is shown. An assembling structure 1300 of FIG. 13 may be understood the same as or similar to the assembling structure 600 of FIG. 6.

Referring to FIG. 13, the assembling structure 1300 may include a first coupling portion 1310, a second coupling portion 1320, a third coupling portion 1330, a fixing portion 1340, a first fixing member 1350, a second fixing member 1360, a third fixing member 1370 and a fourth fixing member 1380.

According to an embodiment, the first coupling portion 1310 may include a first part 1311 coupled with an installation environment (e.g., a wall, a ceiling, a pole, etc.), a rail structure 1312 and a slit structure 1313. According to an embodiment, a shape of the first part 1311 may be changed in consideration of the coupled installation environment. For example, if the first coupling portion 1310 is coupled to a pole, the first part 1311 may be formed in a stepped structure for easy coupling. According to an embodiment, the rail structure 1312 may be disposed above and below based on the third coupling portion 1330, and may be coupled to the third coupling portion 1330 for sliding. That is, the rail structure 1312 may be a path along which the third coupling portion 1330 moves as the state of the assembling structure 1300 changes. According to an embodiment, the slit structure 1313 may be disposed on a side surface of the first part 1311. The third coupling portion 1330 may be inserted into the slit structure 1313 in a specific state (e.g., a first state) of the assembling structure 1300. In addition, the first coupling portion 1310 may be coupled to the third coupling portion 1330 through the first fixing member 1350, and may be fixed by connecting to the fixing portion 1340 through the third fixing member 1370.

According to an embodiment, the second coupling portion 1320 may be coupled to a communication equipment. In this case, it may include holes through which the first coupling member 1325 for coupling with the communication equipment passes. The second coupling portion 1320 includes four holes in the assembling structure 1300, but the present disclosure is not limited thereto. For example, the second coupling portion 1320 may include at least one or more holes for coupling with communication equipment. The number or shape of the at least one or more holes may be determined based on the first coupling member 1325 and the communication equipment. According to an embodiment, the second coupling portion 1320 may be coupled to the third coupling portion 1330. In this case, the second coupling portion 1320 may be coupled to the third coupling portion 1330 through the second fixing member 1360. According to an embodiment, the second coupling portion 1320 may be coupled based on the second fixing member 1360 as a rotation axis to perform the tilting function. A maximum tilting angle of the second coupling portion 1320 may be determined based on inclined surfaces of the third coupling portion 1330. In addition, the second coupling portion 1320 may be connected to the fixing portion 1340 through the fourth fixing member 1380 to be fixed in the tilted state after tilting.

According to an embodiment, the third coupling portion 1330 may be coupled to the first coupling portion 1310 through the first fixing member 1350. The third coupling portion 1330 may be coupled to the second coupling portion 1320 through the second fixing member 1360. The third coupling portion 1330 may be coupled to the fixing portion 1340 through the third fixing member 1370. In addition, the third coupling portion 1330 may be coupled with the rail structure 1312 of the first coupling portion 1310 to perform a sliding operation to be described. According to an embodiment, the third coupling portion 1330 may include a protrusion. In this case, the protrusion may include a first inclined surface contacted if the second coupling portion 1320 is tilted up and a second inclined surface contacted if the second coupling portion 1320 is tilted down.

According to an embodiment, the fixing portion 1340 may be coupled to the first coupling portion 1310 and the third coupling portion 1330 through the third fixing member 1370. In addition, the fixing portion 1340 may be coupled to the second coupling portion 1320 by the fourth fixing member 1380 for fixing the second coupling portion 1320 in the tilted state.

As described above in FIG. 13, the assembling structure 1300, which is connected to the first coupling portion 1310, the second coupling portion 1320, the third coupling portion 1330 and the fixing portion 1340, may be formed in the structure allowing the length adjustment and the tilting.

Figure 14:
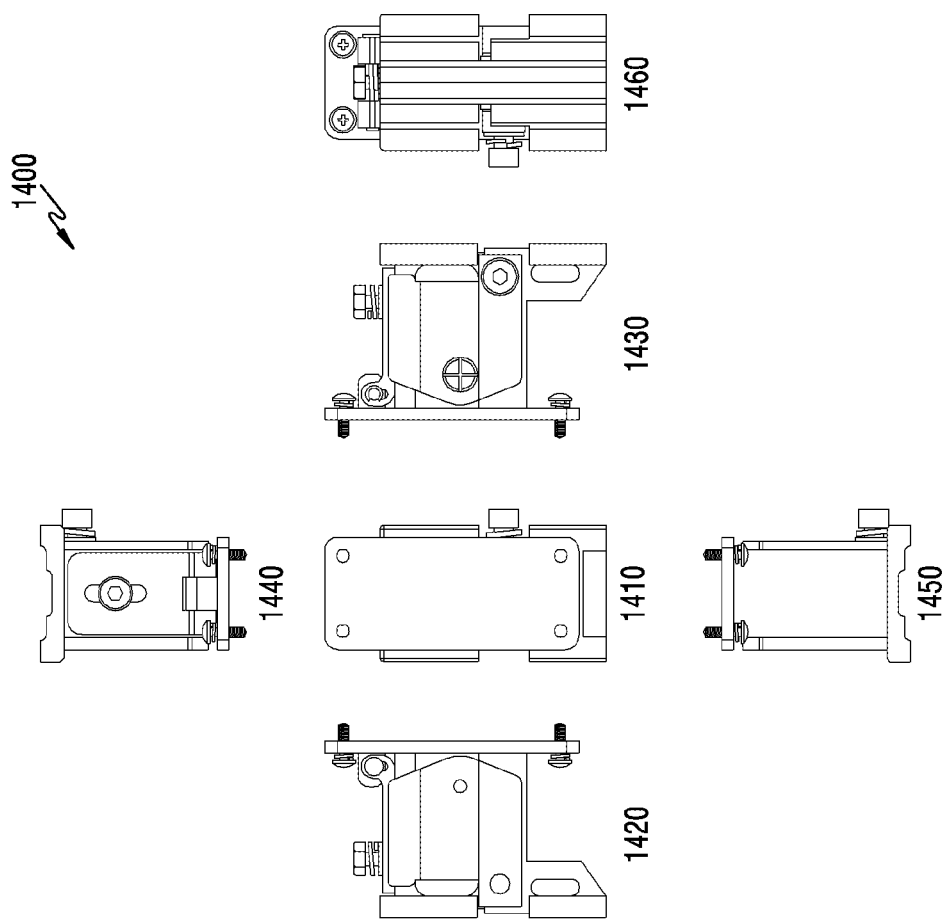
FIG. 14 is a diagram illustrating six views of an apparatus according to various embodiments.

FIG. 14 is a diagram illustrating six views of an apparatus according to various embodiments. An assembling structure 1400 of FIG. 14 may be understood the same as or similar to the assembling structure 1300 of FIG. 13. FIG. 14 explains the assembling structure 1400 in a first state by way of example, for the sake of description.

Referring to a front view 1410, the assembling structure 1400 may overlap a second coupling portion and a first coupling portion. At this time, the second coupling portion is illustrated to be relatively smaller than the first coupling portion, but this is merely an example. For example, a shape of the second coupling portion may be changed based on a type of communication equipment coupled to the second coupling portion, a size of the communication equipment, or a coupling manner with the communication equipment. As another example, the shape of the first coupling portion may be changed based on an installation environment coupled with the first coupling portion, a coupling manner, and the like. Referring to a left side view 1420 and a right side view 1430, a first fixing member and a second fixing member of the assembling structure 1400 are illustrated to pass from the right side to the left side, which is merely an example, and may pass from the left side to the right side. In addition, the first fixing member may be formed to protrude from the right side, but may vary depending on a fixing manner of the fixing member to be described. For example, if the first fixing member has a structure of a bolt and a nut, both left side and right side may protrude. Referring to an upper side view 1440, the fixing portion may include a hole to be fixed by the third fixing member. However, this is merely an example for convenience of description, and may be formed differently depending on a fixing manner of the third fixing member to be described. In addition, the hole of the fixing portion may be formed in an elliptical shape. This may be a path for moving the third fixing member, if the third coupling portion slides. Referring to a lower side view 1450, a lower surface of the assembling structure 1400 may be shielded by the rail structure of the first coupling portion. In addition, the third coupling portion may be coupled to the rail structure of the first coupling portion. Referring to a rear side view 1460, the first coupling portion may be formed in a stepwise manner. However, the present disclosure is not limited thereto. As described above, the shape of the first coupling portion may be determined based on the installation environment coupled with the first coupling portion, the coupling manner, and the like.

Figure 15:
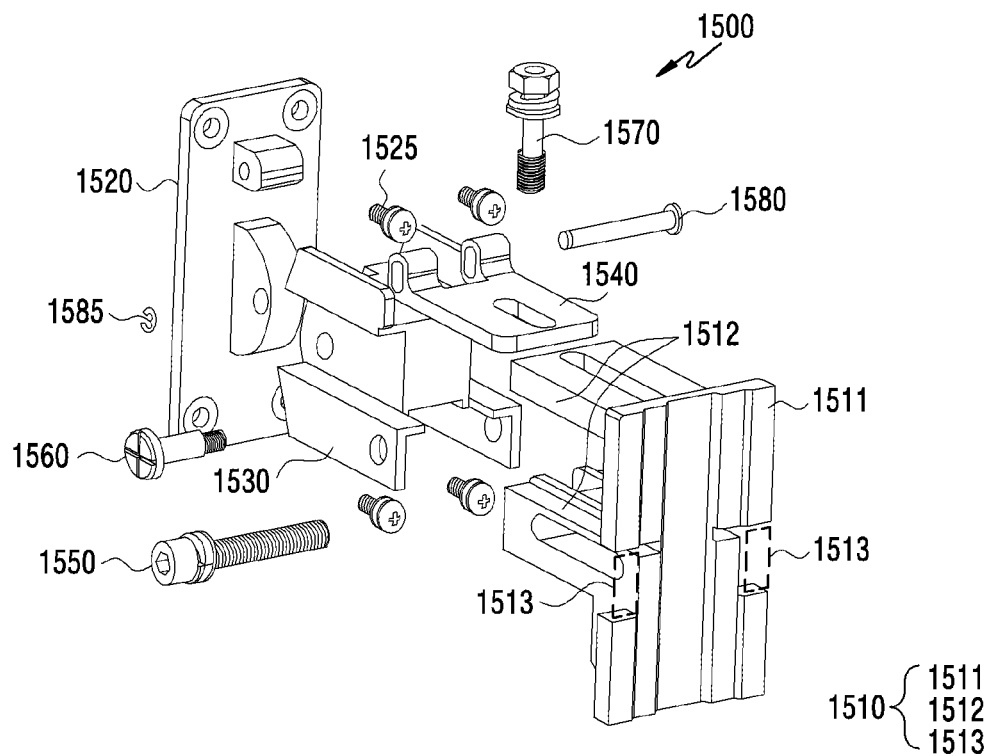
FIG. 15 is an exploded perspective view of an apparatus according to various embodiments.

FIG. 15 is an exploded perspective view of an apparatus according to various embodiments. An assembling structure 1500 of FIG. 15 may be understood the same as or similar to the assembling structure 1300 of FIG. 13. For example, description of a first coupling portion 1510 may adopt the description of the first coupling portion 1310 of FIG. 13. In addition, the assembling structure 1500 of FIG. 15 is for convenience of description, and the present disclosure is not limited thereto. For example, a shape of the first coupling portion may be changed based on an installation environment coupled with the first coupling portion, a coupling manner, and the like, and a shape of a second coupling portion may be changed based on a type of communication equipment coupled with the second coupling portion, a communication equipment size or a coupling manner with the communication equipment. In other words, the assembling structure 1500 of FIG. 15 may indicate that the structure may be changed based on installation conditions.

According to an embodiment, the assembling structure 1500 may include a first coupling portion 1510, a second coupling portion 1520, a third coupling portion 1530 and a fixing portion 1540.

According to an embodiment, the first coupling portion 1510 may include a first part 1511 coupled with an installation environment (e.g., a wall, a ceiling, a pole, etc.), a rail structure 1512 and a slit structure 1513. According to an embodiment, a shape of the first part 1511 may be changed by considering an installation environment coupled. For example, if the first coupling portion 1510 is coupled to a pole, the first part 1511 may be formed in a stepped structure for easy coupling. According to an embodiment, the rail structure 1512 may be disposed above and below based on the third coupling portion 1530, and may be coupled to the third coupling portion 1530 for sliding. That is, the rail structure 1512 may be a path for moving the third coupling portion 1530 as the state of the assembling structure 1500 changes. According to an embodiment, the slit structure 1513 may be disposed on a side surface of the first part 1511. The third coupling portion 1530 may be inserted into the slit structure 1513 in a specific state (e.g., a first state) of the assembling structure 1500. In addition, the first coupling portion 1510 may be coupled to the third coupling portion 1530 through the first fixing member 1550, and may be fixed by connecting to the fixing portion 1540 through the third fixing member 1570.

According to an embodiment, the first coupling portion 1510 may be connected and fixed with the third coupling portion 1530 by the first fixing member 1540. In this case, to be connected and fixed by the first fixing member 1540, the first coupling portion 1510 and the third coupling portion 1530 may include holes. In particular, the holes of the first coupling portion 1510 may be formed in an elliptical shape considering that the third coupling portion 1530 moves by the sliding operation. Also, the first coupling portion 1510 may be connected and fixed with the third coupling portion 1530 and the fixing portion 1540 by the third fixing member 1570. At this time, to be connected and fixed by the third fixing member 1570, the first coupling portion 1510, the third coupling portion 1530 and the fixing portion 1540 may include holes. For example, the holes of the first coupling portion 1510 and the fixing portion 1540 may be formed in an elliptical shape considering that the third coupling portion 1530 moves by the sliding operation.

According to an embodiment, the second coupling portion 1520 may be coupled with the third coupling portion 1530 by the second fixing member 1560. At this time, to be connected and fixed by the second fixing member 1560, the second coupling portion 1520 and the third coupling portion 1530 may include holes. In addition, the second coupling portion 1520 may be coupled with the fixing portion 1540 by the fourth fixing member 1580. At this time, to be coupled by the fourth fixing member 1580, the second coupling portion 1520 and the fixing portion 1540 may include holes. According to an embodiment, the second coupling portion 1520 may be connected to four first coupling members 1525 for coupling with the communication equipment, and may include holes for doing so. However, the present disclosure is not limited thereto. For example, the second coupling portion 1520 may be connected with one, two, or three first coupling members 1525, and may include corresponding holes.

According to an embodiment, the second coupling portion 1520 may be tilted based on the second coupling member 1560 as a rotation axis. For example, the second coupling portion 1520 may be tilted up based on the second coupling member 1560. As another example, the second coupling portion 1520 may be tilted down based on the second coupling member 1560. In addition, the second coupling portion 1520 may be tilted by the fourth coupling member 1580 and then fixed in the tilted state. At this time, the fourth coupling member 1580 may be fixed by a fixing ring 1585.

According to an embodiment, the third coupling portion 1530 may be coupled to the first coupling portion 1510, the second coupling portion 1520 and the fixing portion 1540. Herein, if the third coupling portion 1530 is coupled to the first coupling portion 1510, it may be coupled to a rail structure of the first coupling portion 1510. That is, the assembling structure 1500 may be changed from the first state to the second state by the operation of the third coupling portion 1530, or may be changed from the second state to the first state. Also, the third coupling portion 1530 may include a plurality of holes for coupling with the fixing members. For example, the third coupling portion 1530 may include holes for coupling with the first fixing member 1550. As another example, the third coupling portion 1530 may include a hole for coupling with the second fixing member 1560. As yet another example, the third coupling portion 1530 may include a hole for coupling with the third fixing member 1570.

According to an embodiment, the fixing portion 1540 may be coupled to the first coupling portion 1510, the second coupling portion 1520 and the third coupling portion 1530. Also, the fixing portion 1540 may include a plurality of holes for coupling the fixing members. For example, the fixing portion 1540 may include a hole for coupling the third fixing member 1570. As another example, the fixing portion 1540 may include holes for coupling the fourth fixing member 1580.

According to an embodiment, the first coupling member 1525 may be used to couple the second coupling portion 1520 and the communication equipment. Also, the first coupling member 1525 may be changed in shape according to its fixing manner. For example, the first coupling member 1525 may be formed with a screw. As another example, the first coupling member 1525 may be formed with a bolt and a nut. That is, the first coupling member 1525 may differ based on the manner and the condition for coupling the assembling structure 1500 and the communication equipment.

According to an embodiment, the first fixing member 1550 may be connected through the first coupling portion 1510 and the third coupling portion 1530. Also, the first fixing member 1550 may be changed in shape according to its fixing manner. For example, the first fixing member 1550 may be formed with a screw. As another example, the first fixing member 1550 may be formed with a bolt and a nut.

According to an embodiment, the second fixing member 1560 may be connected through the second coupling portion 1520 and the third coupling portion 1530. Hence, the second fixing member 1560 may serve as the rotation axis of the tilting operation, while the second coupling portion 1520 is tilted. Also, the second fixing member 1560 may be changed in shape according to its fixing manner. For example, the second fixing member 1560 may be formed with a pin.

According to an embodiment, the third fixing member 1570 may be connected through the first coupling portion 1510, the third coupling portion 1530 and the fixing portion 1540. Also, the third fixing member 1570 may be changed in shape according to its fixing manner. For example, the third fixing member 1570 may be formed with a screw. As another example, the third fixing member 1570 may be formed with a bolt and a nut.

According to an embodiment, the fourth fixing member 1580 may be connected through the second coupling portion 1520 and the fixing portion 1540. Also, the fourth fixing member 1580 may be changed in shape according to its fixing manner. For example, the fourth fixing member 1580 may be formed with a pin. According to an embodiment, if the second coupling portion 1520 is tilted (e.g., the up tilting state or the down tilting state of the assembling structure 1500), the assembling structure 1500 may be tilted and fixed by the fourth fixing member 1580. At this time, the fixing ring 1585 may be coupled to the fourth fixing member 1580 for the fixing.

The shape disclosed in FIG. 15 is merely an example, and the present disclosure is not limited thereto. For example, the surface in which the second coupling portion 1520 of the assembling structure 1500 and the communication equipment are coupled may be a curved surface, rather than a flat surface, in consideration of an external shape of the communication equipment. In other words, the assembling structure 1500 of FIG. 15 is merely the structure for illustration, and the shape of the assembling structure 1500 may be changed based on installation conditions in consideration of the coupling manner and the installation environment.

Figure 16:
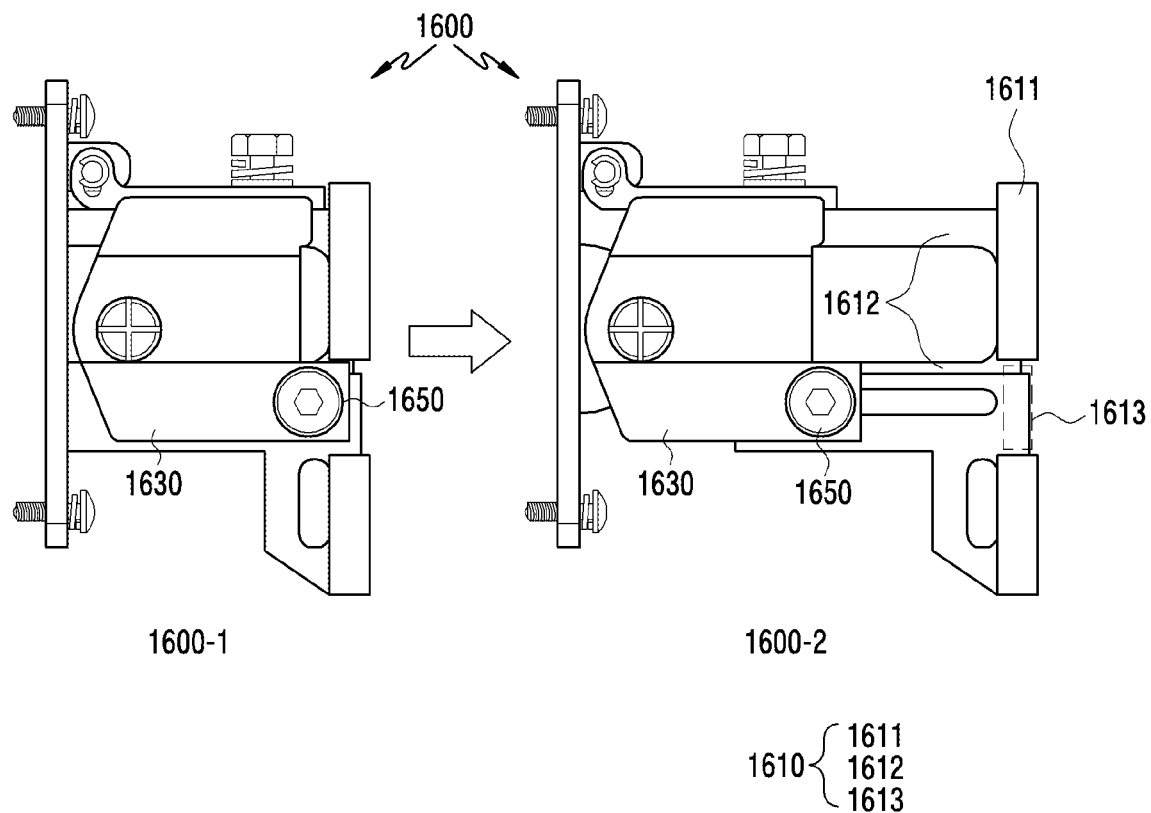
FIG. 16 is a diagram illustrating a first state and a second state of an apparatus according to various embodiments.
Figure 17:
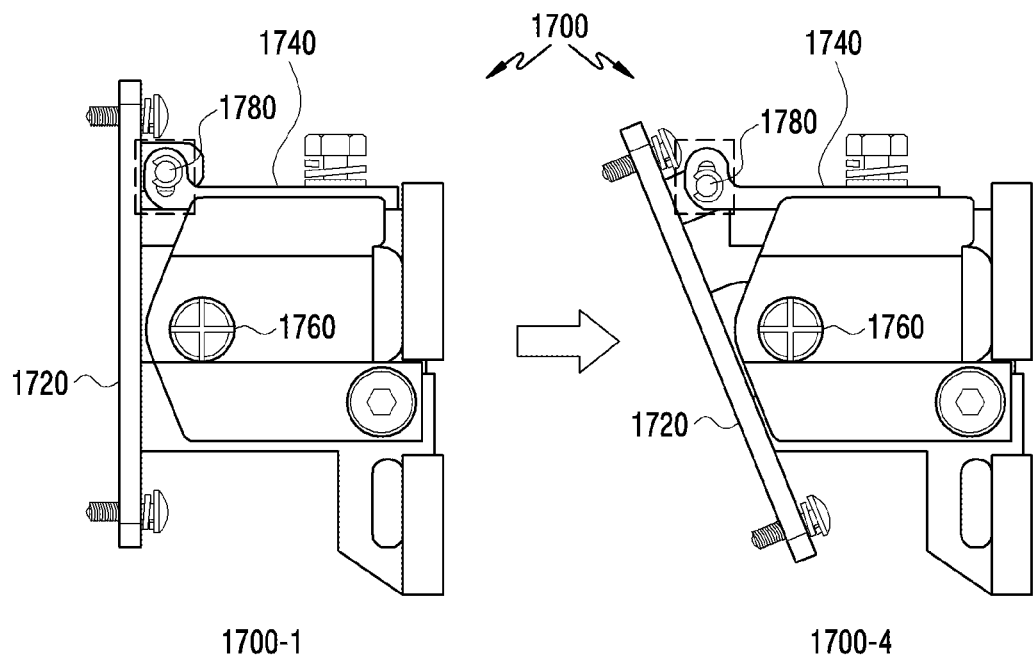
FIG. 17 is a diagram illustrating a down tilting state of an apparatus according to various embodiments.
Figure 18:
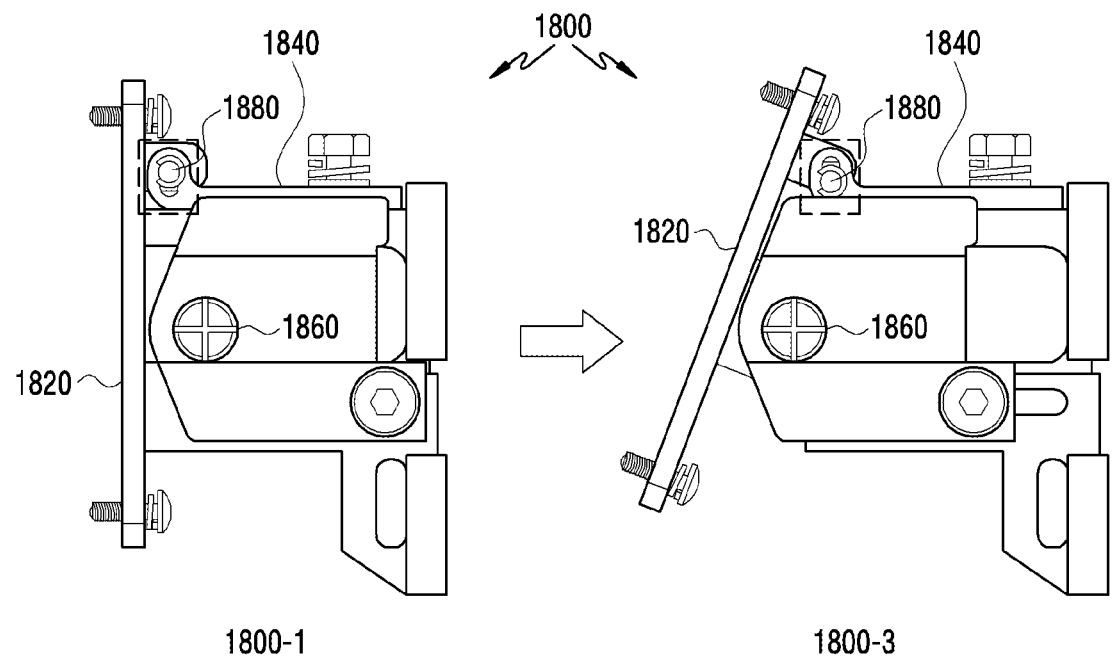
FIG. 18 is a diagram illustrating an up tilting state of an apparatus according to various embodiments.

Hereafter, FIG. 16 through FIG. 18 are referenced to illustrate a method for, if a state of an assembling structure is changed, maintaining the changed state.

FIG. 16 is a diagram illustrating a first state and a second state of an apparatus according to various embodiments. An assembling structure 1600 of FIG. 16 may be understood the same as or similar to the assembling structure 800 of FIG. 8. For example, description of a first state 1600-1 of the assembling structure 1600 may equally adopt the description of the first state 800-1 of the assembling structure 800 of FIG. 8. Accordingly, a redundant description is not repeated.

According to an embodiment, the assembling structure 1600 may be changed in the state according to sliding of a third coupling portion 1630. For example, the assembling structure 1600 of the first state 1600-1 may be changed to a second state 1600-2 through a sliding operation in which the third coupling portion 1630 moves away from a first part 1611 along a rail structure 1612 of the first coupling portion 1610. According to an embodiment, the assembling structure 1600 may be fixed by the first fixing member 1 1350 after its state is changed. For example, the first fixing member 1 1350 of a screw shape is coupled with the third coupling portion 1630 and the first coupling portion 1610 and the assembling structure 1600 may be fixed in the second state 1600-2.

In FIG. 16, the sliding and fixing operations of the assembling structure 1600 have been described, if changing from the first state 1600-1 to the second state 1600-2, but the reverse may be applied in the same manner That is, if changing from the second state 1600-2 to the first state 1600-1, the third coupling portion 1630 of the assembling structure 1600 may perform the sliding operation of moving along the rail structure 1612 of the first coupling portion 1610 and approaching the first part 1611, and the third coupling portion 1630 may be inserted into the slit structure 1613. Also, in the first state 1600-1, the assembling structure 1600 may be fixed by the first fixing member 11350. In addition, the second state 1600-2 of the assembling structure 1600 may indicate that the third coupling portion 1630 moves away from the first part 1611 of the first coupling portion 1610 over a minimum separation distance. Herein, the minimum separation distance may indicate a separation distance between the third coupling portion 1630 and the first part 1611 if the assembling structure 1600 is in the first state 1600-1. That is, the second state 1600-2 may not indicate that the third coupling portion 1630 and the first part 1611 are in a maximum separation distance.

FIG. 17 is a diagram illustrating a down tilting state of an apparatus according to various embodiments. An assembling structure 1700 of FIG. 17 may be understood the same as or similar to the assembling structure 1100 of FIG. 11. Hence, redundant description is not repeated here.

According to an embodiment, the assembling structure 1700 may be changed from a first state 1700-1 to a down tilting state 1700-4. If changing to the down tilting state 1700-4, a second coupling portion 1720 may be tilted down by a specific angle based on a second fixing member 1760 as a rotation axis. At this time, given that no tilting is 0°, the specific angle may indicate a value between 0° and a maximum tilting angle, and the maximum tilting angle may be determined based on an inclined surface of a protrusion of a third coupling portion 1730.

According to an embodiment, the assembling structure 1700 may be fixed in the down tilting state 1700-4. If the assembling structure 1700 is changed from the first state 1700-1 to the down tilting state 1700-4, a position of a fourth fixing member 1780 is changed to fix the assembling structure 1700 in the down tilting state 1700-4. At this time, a shape of holes of the second coupling portion 1720 and a fixing portion 1740 for the fourth fixing member 1780 may be formed in a structure for changing the position of the fourth fixing member 1780. For example, the holes of the second coupling portion 1720 and the fixing portion 1740 for the fourth fixing member 1780 may be formed in an elliptical shape.

FIG. 17 illustrates the example in which the state of the assembling structure 1700 is changed from the first state 1700-1 to the down tilting state 1700-4, but the present disclosure is not limited thereto. For example, the state of the assembling structure 1700 may be changed from the first state 1700-1 to the second state and then changed to the down tilting state 1700-4 as described in FIG. 11. In other words, it may indicate that the state of the assembling structure 1700 is changed based on installation conditions considering an installation environment of the assembling structure 1700, communication equipment to be coupled, and the like.

FIG. 18 is a diagram illustrating an up tilting state of an apparatus according to various embodiments. An assembling structure 1800 of FIG. 18 may be understood the same as or similar to the assembling structure 900 of FIG. 9. Hence, redundant description is not repeated here.

According to an embodiment, the assembling structure 1800 may be changed from a first state 1800-1 to an up tilting state 1800-3. If changing to the up tilting state 1800-3, a second coupling portion 1820 may be tilted up by a specific angle based on a second fixing member 1860 as a rotation axis. At this time, given that no tilting is 0°, the specific angle may indicate a value between 0° and a maximum tilting angle, and the maximum tilting angle may be determined based on an inclined surface of a protrusion of a third coupling portion 1830.

According to an embodiment, the assembling structure 1800 may be fixed in the up tilting state 1800-3. If the assembling structure 1800 is changed from the first state 1800-1 to the up tilting state 1800-3, a position of a fourth fixing member 1880 may be changed to fix the assembling structure 1800 in the up tilting state 1800-3. At this time, a shape of holes of the second coupling portion 1820 and a fixing portion 1840 for the fourth fixing member 1880 may be formed in a structure for changing the position of the fourth fixing member 1880. For example, the holes of the second coupling portion 1820 and the fixing portion 1840 for the fourth fixing member 1880 may be formed in an elliptical shape.

FIG. 18 illustrates the example in which the state of the assembling structure 1800 is changed from the first state 1800-1 to the up-tilt state 1800-3, but the present disclosure is not limited thereto. For example, the state of the assembling structure 1800 may be changed from the first state 1800-1 to the second state and then changed to the up tilting state 1800-3 as described in FIG. 9. In other words, it may indicate that the state of the assembling structure 1800 is changed based on installation conditions in consideration of an installation environment of the assembling structure 1800, communication equipment to be coupled, and the like.

Figure 19:
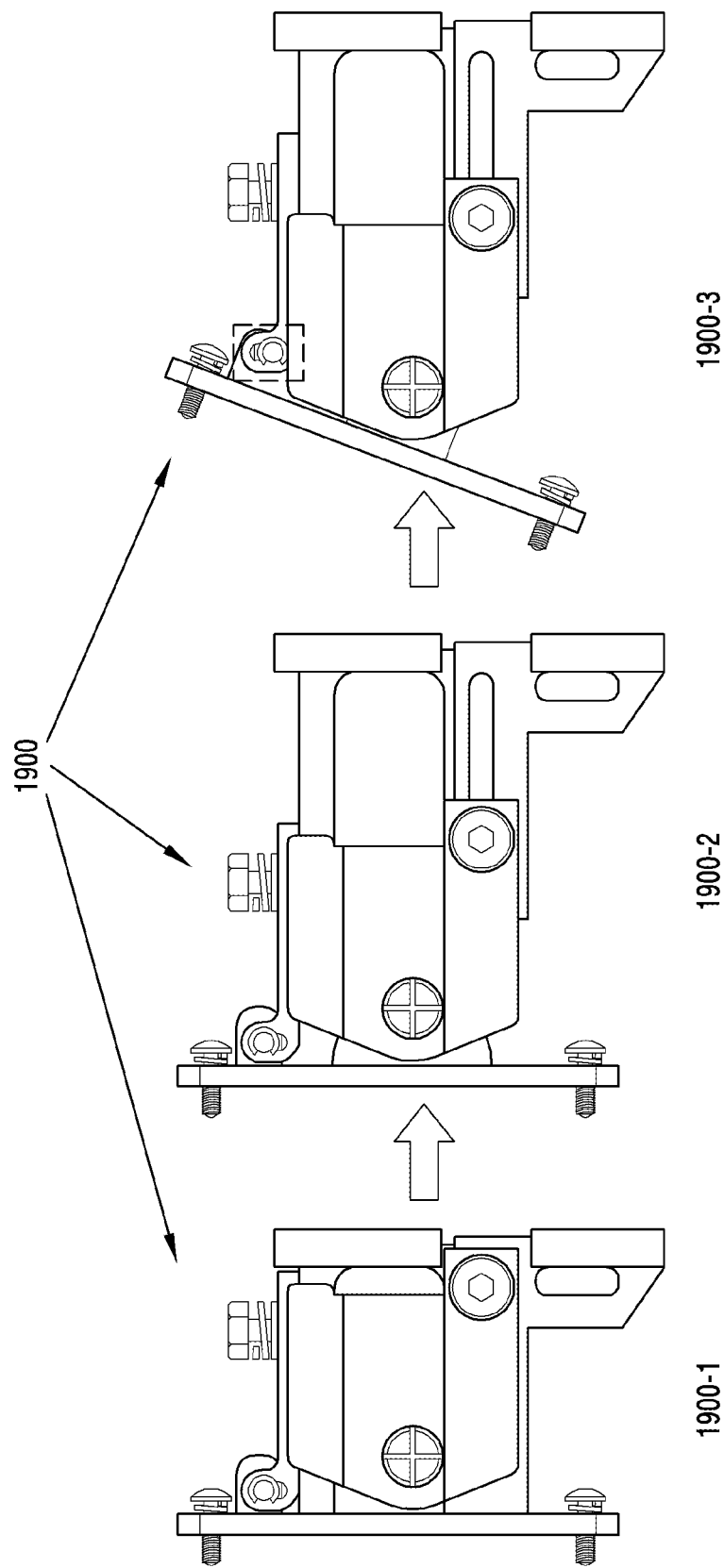
FIG. 19 is a diagram illustrating an example of a state change of an apparatus according to various embodiments.

FIG. 19 is a diagram illustrating an example of a state change of an apparatus according to various embodiments. An assembling structure 1900 and states 1900-1, 1900-2, and 1900-3 of the assembling structure of FIG. 19 may be understood the same as or similar to the assembling structure and the assembling structure states of FIG. 8 through FIG. 10. Thus, redundant descriptions may not be repeated.

Referring to FIG. 19, the slidable assembling structure 1900 according to various embodiments of the present disclosure may be slid and then tilted to avoid interference between communication equipment and an installation environment due to the tilting if the sliding function and the tilting function are applied at the same time, and the assembling structure 1900 may be fixed by fixing members after sliding and tilting. In other words, the assembling structure 1900 may change from the first state 1900-1 to the second state 1900-2, and then change from the second state 1900-2 to the up tilting state 1900-3. While FIG. 19 shows the example that the state of the assembling structure 1900 is changed from the first state 1900-1 to the second state 1900-2, and then changed to the up-tilt state 1900-3, this is merely an example and may indicate that the state of the assembling structure 1900 is changed based on installation conditions considering the installation environment of the assembling structure 1900, the communication equipment to be coupled, and the like.

Figure 20:
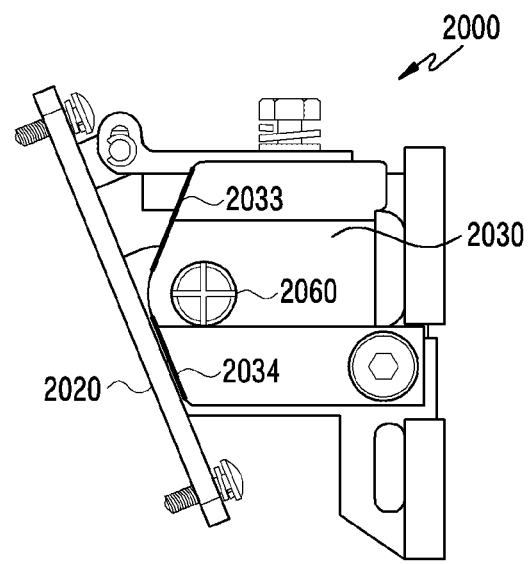
FIG. 20 is a diagram illustrating an inclined surface of a protrusion of an apparatus according to various embodiments.

FIG. 20 is a diagram illustrating an inclined surface of a protrusion of an apparatus according to various embodiments. For the sake of explanation, FIG. 20 explains based on a down tilting state of an assembling structure 2000, but it is apparent that it may be applied to an up tilting state. In addition, descriptions are based on the state that the assembling structure 2000 is tilted down at a maximum tilting angle, but this is only for the sake of explanation and even tilting at a specific angle rather than the maximum tilting angle may be understood in the same manner.

Referring to FIG. 20, a third coupling portion 2030 of the assembling structure 2000 may include a protrusion including a first inclined surface 2033 and a second inclined surface 2034. The first inclined surface 2033 or the second inclined surface 2034 may be inclined surfaces formed to support a load of communication equipment coupled with the second coupling portion 2020, in the maximum angle tilting. That is, compared to a small tilting angle, the load may increase due to the inclination if the tilting is at the maximum tilting angle, and the first inclined surface 2033 or the second inclined surface 2034 may be formed in a supporting structure. According to an embodiment, the maximum tilting angle of the assembling structure 2000 may be determined based on the first inclined surface 2033 or the second inclined surface 2034. For example, given that an angle between the first inclined surface 2033 and the second coupling portion 2020 of the first state is a first inclination angle, if the first inclined surface 2033 is formed to increase the first inclination angle, the maximum up tilting angle may be increased. Conversely, given that an angle between the second inclined surface 2033 and the second coupling portion 2020 of the first state is a second inclination angle, if the second inclined surface 2034 is formed to increase the second inclination angle, the maximum down tilting angle may be increased.

FIG. 20 has illustrated that the third coupling portion 2030 in which the first inclined surface 2033 and the second inclined surface 2034 have the same maximum tilting angle (e.g., a symmetrical structure), but the present disclosure is not limited thereto. For example, the third coupling portion 2030 may be formed such that the first inclined surface 2033 has a greater maximum tilting angle than the second inclined surface 2034 in consideration of installation conditions. As another example, the third coupling portion 2030 may be formed such that the second inclined surface 2034 has a greater maximum tilting angle than the first inclined surface 2033 in consideration of the installation conditions. That is, the assembling structure 2000 may include the third coupling portion 2030 having an asymmetric structure.

Figure 21:
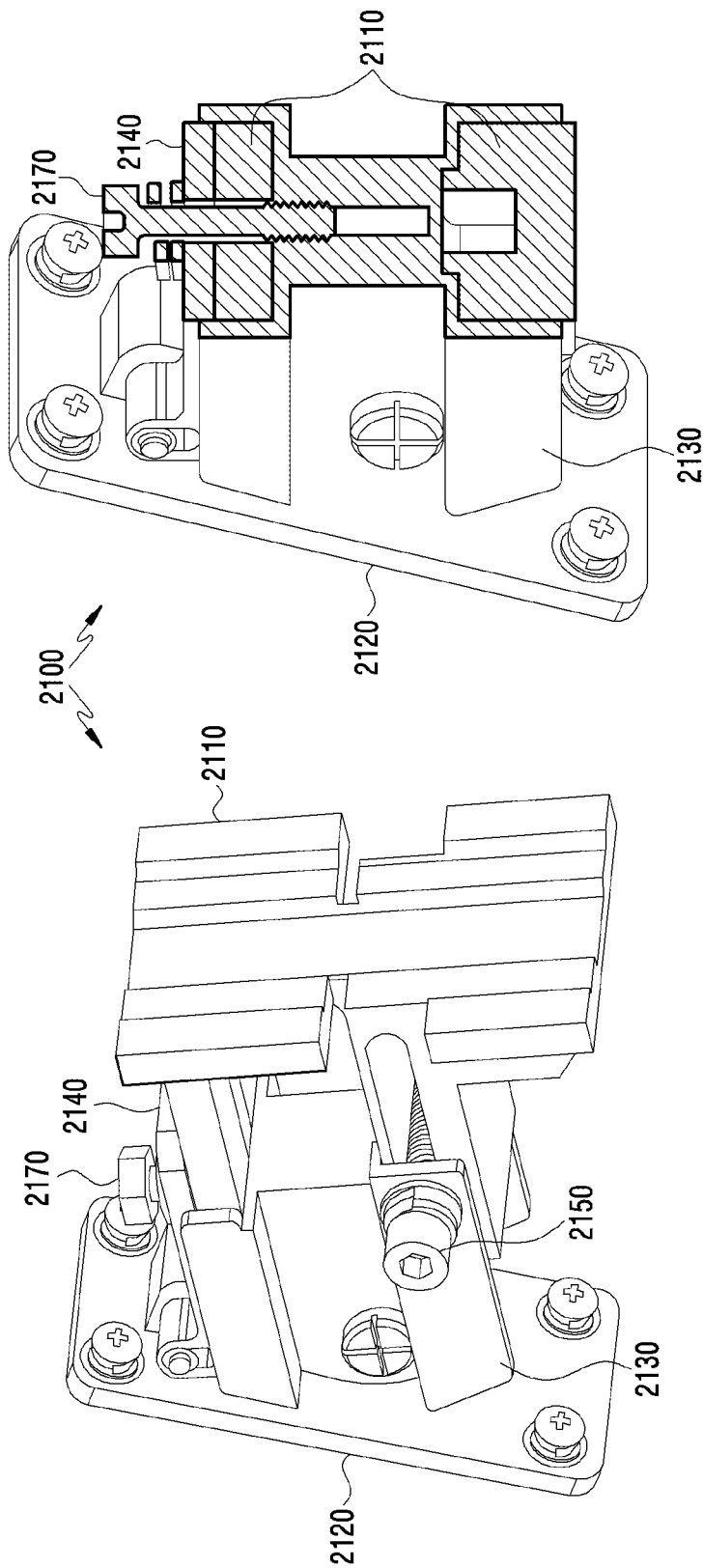
FIG. 21 is a diagram illustrating a cross section in a second state of an apparatus according to various embodiments.

FIG. 21 includes a perspective view and a partial sectional perspective view of a second state of an apparatus according to various embodiments of the present disclosure. An assembling structure 2100 of FIG. 21 may be understood the same as or similar to the assembling structure 800 of FIG. 8. For example, description of a first coupling portion 2110 of the assembling structure 2100 may equally adopt the description of the first coupling portion 810 of the assembling structure 800. Hence, the same description is omitted. In addition, FIG. 21 is illustrated based on a second state of the assembling structure 2100 for the sake of description.

Referring to FIG. 21, the slidable assembling structure 2100 according to various embodiments of the present disclosure may include a coupling structure of a first coupling portion 2110, a third coupling portion 2130 and a fixing portion 2140 for preventing and/or reducing sagging caused by a load of a second coupling portion 2120 or communication equipment (not shown) coupled with the second coupling portion 2120 in the sliding operation of the third coupling portion 2130. Referring to a right drawing of FIG. 21, a third fixing member 2170 may be coupled to pass through the first coupling portion 2110, the third coupling portion 2130 and the fixing portion 2140. That is, the third fixing member 2170 may be coupled through a hole of the first coupling portion 2110, a hole of the third coupling portion 2130 and a hole of the fixing portion 2140. In addition, at least a part of the hole of the third coupling portion 2130 may include a structure which may be screwed. Accordingly, the third fixing member 2170 may be coupled to the screw structure inside the hole of the third coupling portion 2130, and the assembling structure 2100 may prevent and/or reduce the sagging which may be caused by the state change.

Figure 22:
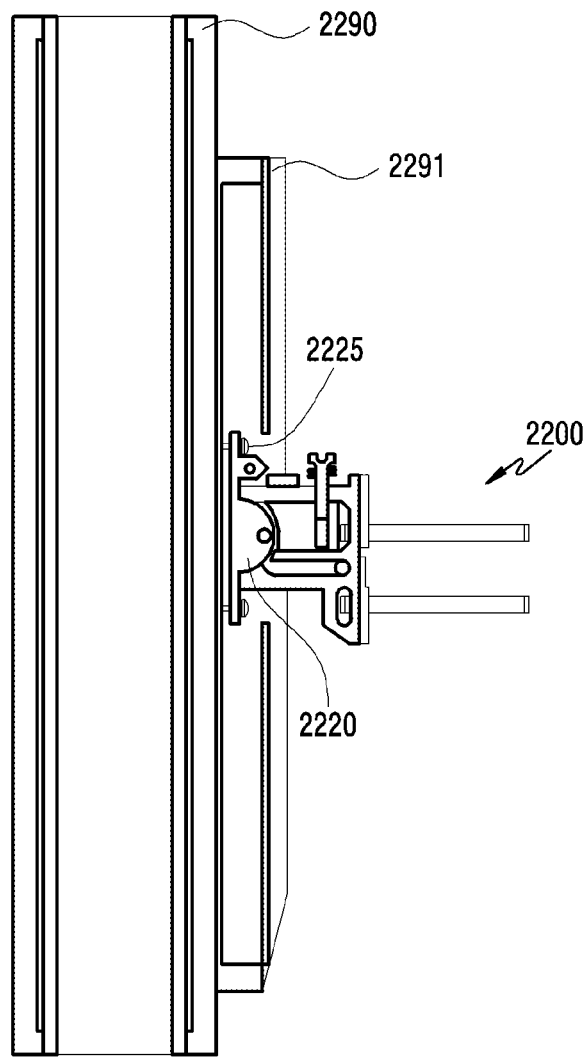
FIG. 22 is a diagram illustrating a coupling state of an apparatus and communication equipment according to various embodiments.

FIG. 22 is a diagram illustrating a coupling state of an apparatus and communication equipment according to various embodiments. For the sake of description, FIG. 22 will be described based on a first state of an assembling structure 2200. However, the present disclosure is not limited thereto, and the same may be equally applied even if the state of the assembling structure 2200 is different. Also, the assembling structure 2200 of FIG. 22 may be understood the same as or similar to the assembling structure 600 of FIG. 6. For example, description of the second coupling portion 2220 of the assembling structure 2200 may equally adopt the description of the second coupling portion 620 of the assembling structure 600.

According to an embodiment, the slidable assembling structure 2200 according to various embodiments of the present disclosure may be coupled to an inside of a heat radiation fin 2291 disposed in communication equipment 2290. For example, the second coupling portion 2220 of the assembling structure 2200 may be coupled to one surface inside the heat radiation fin 2291 through the first coupling member 2225. Hence, an installation space of the assembling structure 2200 and the communication equipment 2290 may be minimized and/or reduced.

Figure 23A:
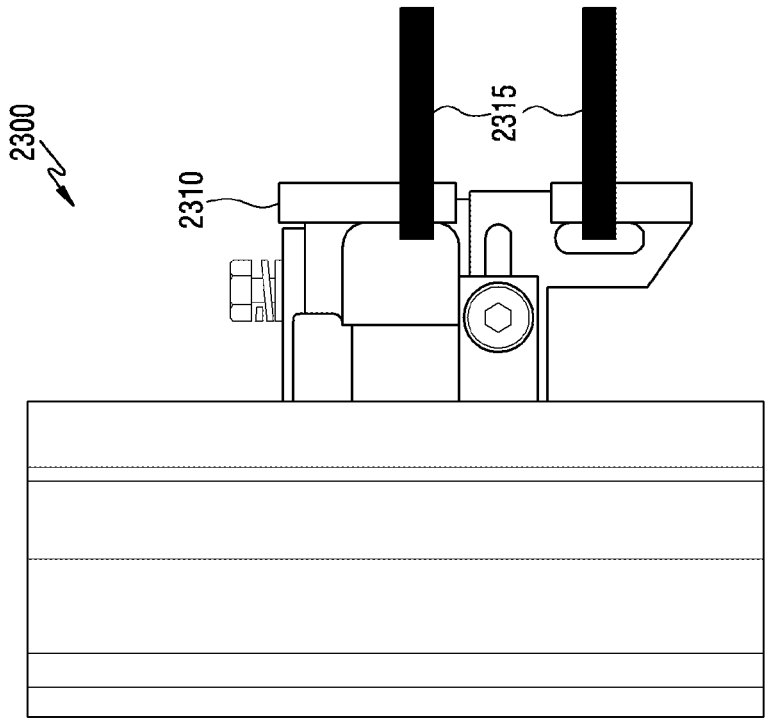
FIG. 23A is a diagram illustrating an example of a coupling structure between an apparatus and an installation environment according to various embodiments.
Figure 23A:
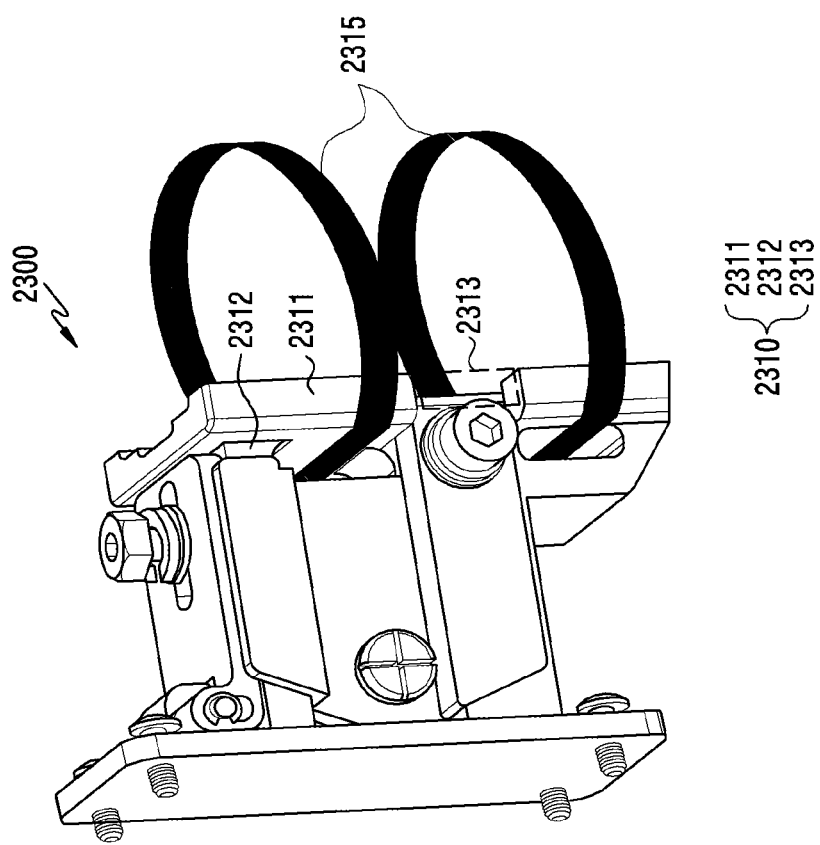

FIG. 23A is a diagram illustrating an example of a coupling structure between an apparatus and an installation environment according to various embodiments. For the sake of description, it is explained that an assembling structure 2300 is assumed to be in a first state. Also, the assembling structure 2300 of FIG. 23 may be understood the same as or similar to the assembling structure 600 of FIG. 6. For example, description of a first coupling portion 2310 may equally adopt the description of the first coupling portion 2310 of the assembling structure 600. Accordingly, a redundant description may not be repeated here.

According to an embodiment, the slidable assembling structure 2300 according to various embodiments of the present disclosure may include a second coupling member 2315 (e.g., a steel band) for coupling with an installation environment (e.g., a wall, a ceiling, a pole). For example, the assembling structure 2300 may further include holes for coupling with the second coupling member 2315 between a first part 2311 and a rail structure 2312, and the second coupling member 2315 may be coupled to a pole through the holes. In FIG. 23A, the two second coupling members 2315 are described by way of example, but the present disclosure is not limited thereto. For example, the assembling structure 2300 may be coupled to the installation environment through one second coupling member 2315 or three second coupling members 2315.

Figure 23B:
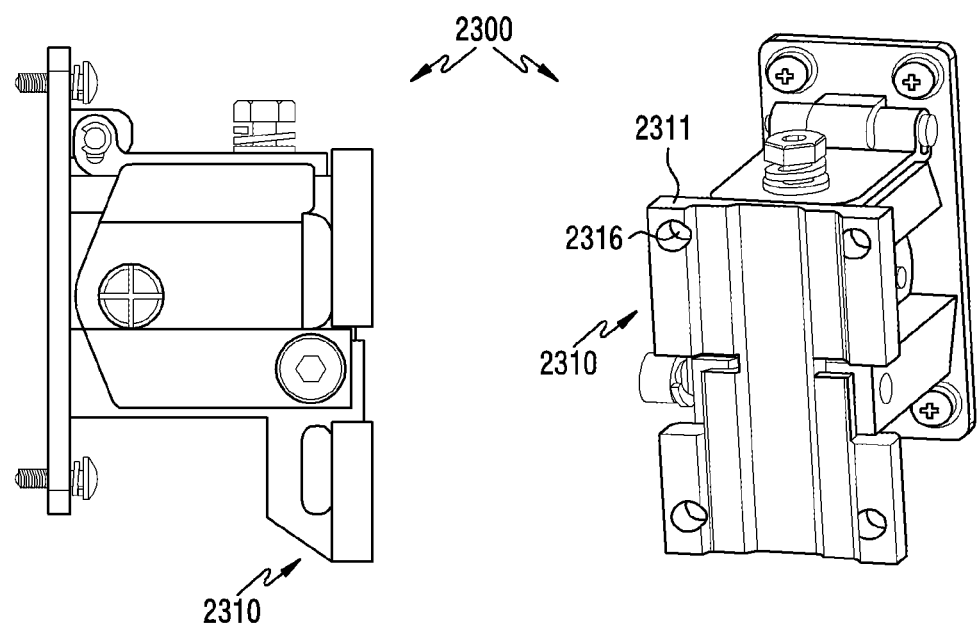
FIG. 23B is a diagram illustrating an example of the coupling structure between the apparatus and the installation environment according to various embodiments.

FIG. 23B is a diagram illustrating an example of the coupling structure between the apparatus and the installation environment according to various embodiments. For the sake of description, it is explained that the assembling structure 2300 is assumed to be in the first state. Also, the assembling structure 2300 of FIG. 23 may be understood the same as or similar the assembling structure 600 of FIG. 6. For example, the description of the first coupling portion 2310 may equally adopt the description of the first coupling portion 2310 of the assembling structure 600. Hence, a redundant description may not be repeated here.

According to an embodiment, the first coupling portion 2310 of the slidable assembling structure 2300 according to various embodiments of the present disclosure may include holes 2316 for coupling with the installation environment (e.g., a wall, a ceiling, a pole). For example, the assembling structure 2300 may include the coupling holes 2316 for easily coupling the first part 2311 and the installation environment. In FIG. 23B, four coupling holes 2316 are described by way of example, but the present disclosure is not limited thereto. For example, the assembling structure 2300 may be coupled to the installation environment through one, two or three coupling holes 2316.

Figure 24:
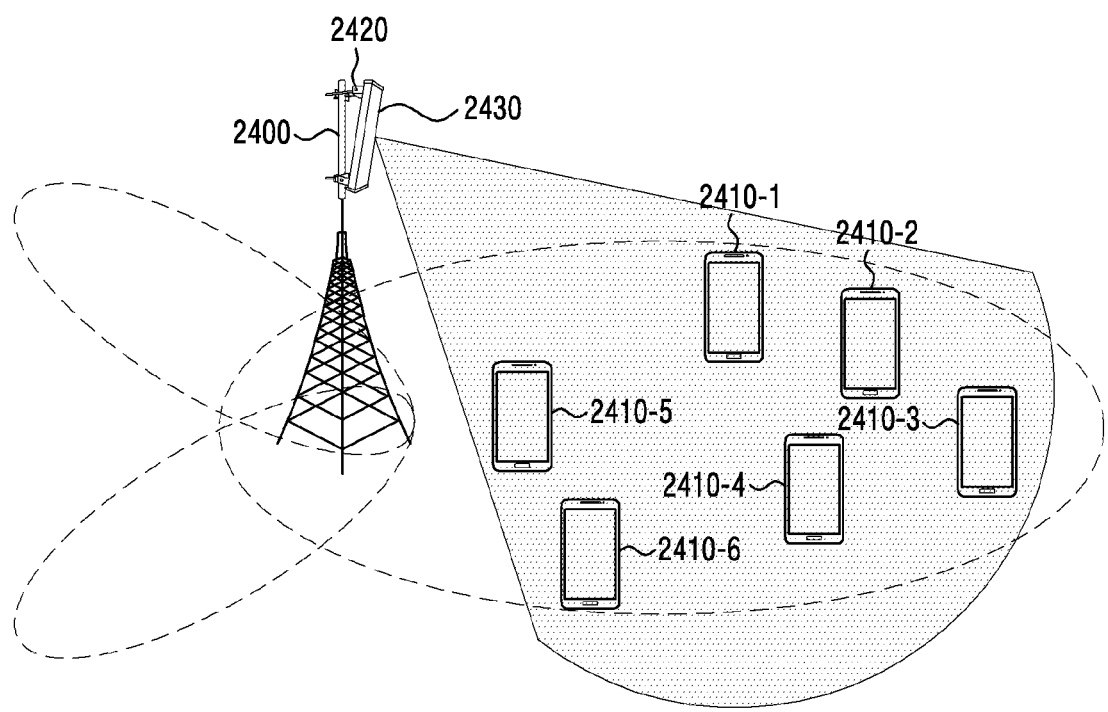
FIG. 24 is a diagram illustrating an example wireless communication system according to various embodiments.

FIG. 24 is a diagram illustrating an example wireless communication system according to various embodiments. The wireless communication environment of FIG. 24 illustrates a base station 2400 and terminals 2410-1 through 2410-6, as some of nodes which use radio channels.

The base station 2400 is a network infrastructure which provides radio access to the terminals 2410-1 through 2410-6. The base station 2400 has coverage defined as a specific geographical area based on a signal transmission distance. The base station 2400 may be referred to as, besides the base station, an 'access point (AP)', an 'eNodeB (eNB)', a '5th generation node (5G node)', a '5G Node B (NB)', a 'wireless point', a 'transmission/reception point (TRP)', an 'access unit', a 'distributed unit (DU)', a 'TRP', a 'radio unit (RU)', a 'remote radio head (RRH)' or other term having technically identical meaning. The base station 2400 may transmit a downlink signal or receive an uplink signal.

The terminals 2410-1 through 2410-6 are devices used by a user, and communicate with the base station 2400 over the radio channel. In some cases, the terminals 2410-1 through 2410-6 may be operated without user's involvement. That is, the terminals 2410-1 through 2410-6 are devices for performing machine type communication (MTC), and may not be carried by the user. The terminals 2410-1 through 2410-6 may be referred to as, besides the terminal, a 'user equipment (UE)', a 'mobile station', a 'subscriber station', a 'customer premises equipment (CPE)', a 'remote terminal', a 'wireless terminal', an 'electronic device', or a 'vehicle terminal', a 'user device', or other terms having technically identical meaning.

According to an embodiment, the base station 2400 may be coupled with communication equipment 2430 by an assembling structure 2420. The assembling structure 2420 of FIG. 24 may be a slidable assembling structure according to an embodiment of the present disclosure. According to an embodiment, if the base station 2400 requires tilting for smooth communication with the terminals 2410-1 through 2410-6, a specific separation distance may be required to minimize and/or reduce interference between the communication equipment 2430 and an installation environment (e.g., a pole of the base station 2400) according to the tilting. In this case, the communication equipment 2430 may be fixed while being slid and tilted by the assembling structure 2420 according to an embodiment of the present disclosure, and the interference may be minimized and/or reduced. Thus, the smooth communication between the base station 2400 and the terminals 2410-1 through 2410-6 may be performed.

Referring to FIG. 6 through FIG. 24, the slidable assembling structure according to an embodiment of the present disclosure may be used in various situations compared to the conventional fixed assembling structure. The conventional fixed assembling structure is fixed to a size determined during the production process, but the slidable assembling structure according to embodiments of the present disclosure may adjust the separation distance between the communication equipment and the installation environment through the sliding operation. Hence, the slidable assembling structure according to an embodiment of the present disclosure may be flexibly installed by adjusting the separation distance based on the installation conditions in consideration of the installation environment (e.g., a wall, a ceiling, a pole), the communication equipment, and the like. In addition, the slidable assembling structure according to the embodiments of the present disclosure may be variously applied merely with the assembling structure designed by one manufacturing process, thus minimizing/reducing production cost and process. Additionally, the separation distance may be adjusted to minimize and/or reduce the size of the slidable assembling structure according to an embodiment of the present disclosure, and thus packaging and delivery may be achieved at low cost with high efficiency compared to the conventional assembling structure. In addition, by use of the slidable assembling structure according to an embodiment of the present disclosure, the communication equipment may adjust the separation distance from the installation environment, and thus the communication equipment may minimize and/or reduce interference with the installation environment.

In addition, the slidable assembling structure according to an embodiment of the present disclosure may efficiently minimize and/or reduce the interference compared to the conventional assembling structure including the tilting function. For example, the conventional assembling structure including the tilting function may be fixed in the separation distance between the communication equipment and the installation environment, or may require a minimum separation distance for its tilting. That is, the conventional assembling structure including the tilting function may be subject to an unnecessary protrusion section due to the structural limit. The slidable assembling structure according to an embodiment of the present disclosure may adjust the separation distance through the sliding operation, and may be spaced apart only by the separation distance required to minimize and/or reduce the interference in performing the tilting function, thus efficiently minimizing and/or reducing the interference. In addition, the conventional assembling structure including the tilting function may perform the tilting function through a plurality of assembling structures, whereas the slidable assembling structure according to an embodiment of the present disclosure may perform the tilting function by one assembling structure.

In addition, the slidable assembling structure according to the embodiments of the present disclosure may achieve high space utilization and low cost installation by coupling with the installation environment through an additional coupling member. For example, the conventional fixed assembling structure or the assembling structure including the tilting function may connect the communication equipment and the installation environment (e.g., a wall, a ceiling, a pole) with a plurality of assembling structures. The slidable assembling structure according to the embodiments of the present disclosure may connect the communication equipment and the installation environment with the single assembling structure, thus minimizing and/or reducing the space usage. In addition, compared to the conventional assembling structure using two assembling structures, the slidable assembling structure according to the embodiments of the present disclosure may be installed at a low cost using one assembling structure and the additional coupling member.

An apparatus according to an embodiment of the present disclosure may include: a first coupling portion including a rail structure comprising a rail and a slit structure comprising a slit, a second coupling portion coupled to communication equipment and a third coupling portion, the third coupling portion may be disposed between the first coupling portion and the second coupling portion, and coupled to the rail structure and the second coupling portion, and may include a protrusion in an area adjacent to the second coupling portion, the protrusion may include a first inclined surface contacted based on the second coupling portion being tilted up and a second inclined surface contacted based on the second coupling portion being tilted down, based on the apparatus being in a first state, the third coupling portion may be configured to move along the rail structure and be inserted into the slit structure, and based on the apparatus being in a second state, the third coupling portion may be configured to move along the rail structure and be disposed to be spaced apart from the first coupling portion.

In an example embodiment, a fixing portion may be further included, and the fixing portion may be coupled to the first coupling portion, the second coupling portion and the third coupling portion.

In an example embodiment, at least one fixing member comprising a fastener may be further included, a first fixing member comprising a first fastener of the at least one fixing member may be connected to the first coupling portion and the third coupling portion, and the first fixing member may be disposed to fix the third coupling portion.

In an example embodiment, a second fixing member comprising a second fastener of the at least one fixing member may be connected to the second coupling portion and the third coupling portion, and the second fixing member may be configured to operate as a rotation axis, while the second coupling portion is tilted.

In an example embodiment, a third fixing member comprising a third fastener of the at least one fixing member may be connected to the first coupling portion, the third coupling portion, and the fixing portion, a fourth fixing member comprising a fourth fastener of the at least one fixing member may be connected to the second coupling portion and the fixing portion, and the fourth fixing member may be disposed to fix the second coupling portion in a tilted state.

In an example embodiment, based on the apparatus being in the second state, wherein a distance between the third coupling portion and the slit structure is a first distance, a maximum value of the first distance may be determined based on the rail structure.

In an example embodiment, based on the second coupling portion being tilted up, a maximum up tilting angle may be determined based on the first inclined surface, and based on the second coupling portion is tilted down, a maximum down tilting angle may be determined based on the second inclined surface.

In an example embodiment, the first inclined surface and the second inclined surface of the protrusion may be formed in an asymmetrical structure.

In an example embodiment, the second coupling portion may be coupled inside a heat radiation fin of the communication equipment.

In an example embodiment, a steel band connected to the first coupling portion may be further included.

A base station according to an example embodiment of the present disclosure may include: communication equipment, a pole and an assembling structure disposed between the pole and the communication equipment, the assembling structure may include: a first coupling portion including a rail structure comprising a rail and a slit structure comprising a slit, a second coupling portion coupled to the communication equipment, and a third coupling portion, the third coupling portion may be disposed between the first coupling portion and the second coupling portion, and coupled to the rail structure and the second coupling portion, and may include: a protrusion in an area adjacent to the second coupling portion, the protrusion may include a first inclined surface contacted based on the second coupling portion being tilted up and a second inclined surface contacted based on the second coupling portion being tilted down, based on the assembling structure being in a first state, the third coupling portion may be configured to move along the rail structure and be inserted into the slit structure, and based on the assembling structure being in a second state, the third coupling portion may be configured to move along the rail structure and be disposed to be spaced apart from the first coupling portion.

In an example embodiment, the assembling structure may further include a fixing portion, and the fixing portion may be coupled to the first coupling portion, the second coupling portion and the third coupling portion.

In an example embodiment, the assembling structure may further include at least one fixing member comprising a fastener, a first fixing member comprising a first fastener of the at least one fixing member may be connected to the first coupling portion and the third coupling portion, and the first fixing member may be disposed to fix the third coupling portion.

In an example embodiment, a second fixing member comprising a second fastener of the at least one fixing member may be connected to the second coupling portion and the third coupling portion, and the second fixing member may be configured to operate as a rotation axis, while the second coupling portion is tilted.

In an example embodiment, a third fixing member comprising a third fastener of the at least one fixing member may be connected to the first coupling portion, the third coupling portion and the fixing portion, a fourth fixing member comprising a fourth fastener of the at least one fixing member may be connected to the second coupling portion and the fixing portion, and the fourth fixing member may be disposed to fix the second coupling portion in a tilted state.

In an example embodiment, based on the apparatus being in the second state, wherein a distance between the third coupling portion and the slit structure is a first distance, a maximum value of the first distance may be determined based on the rail structure.

In an example embodiment, based on the second coupling portion being tilted up, a maximum up tilting angle may be determined based on the first inclined surface, and based on the second coupling portion being tilted down, a maximum down tilting angle may be determined based on the second inclined surface.

In an example embodiment, the first inclined surface and the second inclined surface of the protrusion may be formed in an asymmetrical structure.

In an example embodiment, the assembling structure may be coupled inside a heat radiation fin of the communication equipment.

In an example embodiment, the second coupling portion may be coupled inside a heat radiation fin of the communication equipment.

In the various example embodiments of the present disclosure, the elements included in the present disclosure are expressed in a singular or plural form. However, the singular or plural expression is appropriately selected according to a situation for the convenience of explanation, the present disclosure is not limited to a single element or a plurality of elements, the elements expressed in the plural form may be configured as a single element, and the elements expressed in the singular form may be configured as a plurality of elements.

Meanwhile, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An apparatus comprising:
   a first coupling portion comprising a rail structure comprising a rail and a slit structure comprising a slit;
   a second coupling portion coupled to communication equipment; and
   a third coupling portion,
   wherein the third coupling portion is disposed between the first coupling portion and the second coupling portion, and is coupled to the rail structure and the second coupling portion, and
   the third coupling portion comprises: a protrusion in an area adjacent to the second coupling portion,
   wherein the protrusion comprises a first inclined surface contacted based on the second coupling portion being tilted up and a second inclined surface contacted based on the second coupling portion being tilted down,
   based on the apparatus being in a first state, the third coupling portion is configured to move along the rail structure and is inserted into the slit structure, and
   based on the apparatus being in a second state, the third coupling portion is configured to move along the rail structure and is disposed to be spaced apart from the first coupling portion.

2. The apparatus of claim 1, further comprising
   a fixing portion,
   wherein the fixing portion is coupled to the first coupling portion, the second coupling portion and the third coupling portion.

3. The apparatus of claim 2, further comprising:
   at least one fixing member comprising a fastener,
   wherein a first fixing member comprising a first fastener of the at least one fixing member is connected to the first coupling portion and the third coupling portion, and
   the first fixing member is disposed to fix the third coupling portion.

4. The apparatus of claim 3, wherein a second fixing member comprising a second fastener of the at least one fixing member is connected to the second coupling portion and the third coupling portion, and
   based on the second coupling portion being tilted, the second fixing member is configured to operate as a rotation axis.

5. The apparatus of claim 4, wherein a third fixing member comprising a third fastener of the at least one fixing member is connected to the first coupling portion, the third coupling portion, and the fixing portion,
   a fourth fixing member comprising a fourth fastener of the at least one fixing member is connected to the second coupling portion and the fixing portion, and
   the fourth fixing member is disposed to fix the second coupling portion in a tilted state.

6. The apparatus of claim 1, wherein, based on the apparatus being in the second state, wherein a distance between the third coupling portion and the slit structure is a first distance, a maximum value of the first distance is determined based on the rail structure.

7. The apparatus of claim 1, wherein, based on the second coupling portion being tilted up, a maximum up tilting angle is determined based on the first inclined surface, and based on the second coupling portion being tilted down, a maximum down tilting angle is determined based on the second inclined surface.

8. The apparatus of claim 1, wherein the first inclined surface and the second inclined surface of the protrusion are formed in an asymmetrical structure.

9. The apparatus of claim 1, wherein the second coupling portion is coupled inside a heat radiation fin of the communication equipment.

10. The apparatus of claim 1, further comprising:
a steel band connected to the first coupling portion.

11. A base station comprising:
communication equipment;
a pole; and
an assembling structure disposed between the pole and the communication equipment,
wherein the assembling structure comprises:
a first coupling portion comprising a rail structure comprising a rail and a slit structure comprising a slit,
a second coupling portion coupled to the communication equipment, and
a third coupling portion,
wherein the third coupling portion is disposed between the first coupling portion and the second coupling portion, and is coupled to the rail structure and the second coupling portion, and
the third coupling portion comprising: a protrusion in an area adjacent to the second coupling portion,
wherein the protrusion comprises a first inclined surface contacted based on the second coupling portion being tilted up and a second inclined surface contacted based on the second coupling portion being tilted down,
based on the assembling structure being in a first state, the third coupling portion is configured to move along the rail structure and is inserted into the slit structure, and
based on the assembling structure being in a second state, the third coupling portion is configured to move along the rail structure and is disposed to be spaced apart from the first coupling portion.

12. The base station of claim 11, wherein the assembling structure further comprises a fixing portion,
wherein the fixing portion is coupled to the first coupling portion, the second coupling portion and the third coupling portion.

13. The base station of claim 12, wherein the assembling structure further comprises at least one fixing member comprising a fastener,
wherein a first fixing member comprising a first fastener of the at least one fixing member is connected to the first coupling portion and the third coupling portion, and
the first fixing member is disposed to fix the third coupling portion.

14. The base station of claim 13, wherein a second fixing member comprising a second fastener of the at least one fixing member is connected to the second coupling portion and the third coupling portion, and
based on the second coupling portion being tilted, the second fixing member is configured to operate as a rotation axis.

15. The base station of claim 14, wherein a third fixing member comprising a third fastener of the at least one fixing member is connected to the first coupling portion, the third coupling portion and the fixing portion,
a fourth fixing member comprising a fourth fastener of the at least one fixing member is connected to the second coupling portion and the fixing portion, and
the fourth fixing member is disposed to fix the second coupling portion in a tilted state.

16. The base station of claim 11, wherein, based on the apparatus being in the second state, wherein a distance between the third coupling portion and the slit structure is a first distance, a maximum value of the first distance is determined based on the rail structure.

17. The base station of claim 11, wherein, based on the second coupling portion being tilted up, a maximum up tilting angle is determined based on the first inclined surface, and
based on the second coupling portion being tilted down, a maximum down tilting angle is determined based on the second inclined surface.

18. The base station of claim 11, wherein the first inclined surface and the second inclined surface of the protrusion are formed in an asymmetrical structure.

19. The base station of claim 11, wherein the second coupling portion is coupled inside a heat radiation fin of the communication equipment.

20. The base station of claim 11, further comprising:
a steel band connected to the first coupling portion.

* * * * *